US007596531B2

(12) United States Patent
de Jong

(10) Patent No.: US 7,596,531 B2
(45) Date of Patent: Sep. 29, 2009

(54) METHOD AND APPARATUS FOR PROTECTING AGAINST SIDE CHANNEL ATTACKS AGAINST PERSONAL IDENTIFICATION NUMBERS

(75) Inventor: Eduard de Jong, San Mateo, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 1494 days.

(21) Appl. No.: 10/164,662

(22) Filed: Jun. 5, 2002

(65) Prior Publication Data

US 2003/0229598 A1 Dec. 11, 2003

(51) Int. Cl.
*G06F 10/00* (2006.01)
(52) U.S. Cl. ................ 705/72; 705/1; 705/50; 713/184; 713/168
(58) Field of Classification Search ......... 705/1, 705/50, 72; 713/183, 163
See application file for complete search history.

(56) References Cited

U.S. PATENT DOCUMENTS

| 5,495,235 | A |   | 2/1996  | Durinovic-Johri et al. |
|-----------|---|---|---------|------------------------|
| 5,699,514 | A |   | 12/1997 | Durinovic-Johri et al. |
| 5,721,781 | A |   | 2/1998  | Deo et al. ........ 380/25 |
| 5,742,756 | A |   | 4/1998  | Dillaway et al. ...... 395/186 |
| 5,781,723 | A |   | 7/1998  | Yee et al. ........ 395/186 |
| 5,826,016 | A |   | 10/1998 | Ito et al. |
| 5,841,866 | A |   | 11/1998 | Bruwer et al. |
| 5,930,363 | A |   | 7/1999  | Stanford et al. ........ 380/24 |
| 6,009,177 | A | * | 12/1999 | Sudia ............ 713/191 |
| 6,018,583 | A |   | 1/2000  | Hawthorne |
| 6,044,154 | A |   | 3/2000  | Kelly |
| 6,052,690 | A |   | 4/2000  | de Jong ........... 707/101 |
| 6,094,656 | A |   | 7/2000  | de Jong ........... 707/100 |
| 6,226,744 | B1 |  | 5/2001  | Murphy et al. ...... 713/200 |
| 6,421,768 | B1 | * | 7/2002 | Purpura ............ 711/164 |
| 6,438,550 | B1 |  | 8/2002  | Doyle et al. ........... 707/9 |
| 6,460,138 | B1 | * | 10/2002 | Morris ............ 713/184 |
| 2002/0147918 | A1 | | 10/2002 | Osthoff et al. ........ 713/193 |

FOREIGN PATENT DOCUMENTS

| GB | 2 347 248 | 8/2000 |
| WO | 97/45817 | 4/1997 |

OTHER PUBLICATIONS

Applied Cryptography $2^{nd}$ edition, 1996; Bruce Schneier, pp. 47-52.*

(Continued)

*Primary Examiner*—Calvin L Hewitt, II
*Assistant Examiner*—John M Winter
(74) *Attorney, Agent, or Firm*—Gunnison, McKay & Hodgson, L.L.P.; Forrest Gunnison

(57) ABSTRACT

A method for private personal identification number (PIN) management includes receiving a first PIN, receiving a first key used to scramble a second PIN that has been validated, receiving a first scrambled PIN comprising the second PIN scrambled with the first key, scrambling the first PIN with the first key to create a second scrambled PIN and validating the first PIN based at least in part on whether the first scrambled PIN matches the second scrambled PIN.

33 Claims, 34 Drawing Sheets

OTHER PUBLICATIONS

International Search Report, PCT/US 03/15953, International filing date May 20, 2003, date Search Report mailed- Jan. 16, 2004.

International Search Report, PCT/US 03/15954, International filing date May 20, 2003, date Search Report mailed- Nov. 5, 2003.

Chan, "Infrastructure of Multi-Application Smart Card", http://home.hkstar.com/~alanchan/papers/multiApplicationSmartCard/, Jul. 25, 2002.

Chen, Zhiqun, "Java Card™ Technology for Smart Cards", *Sun Microsystems*, pp. 11-16, Jun. 2000.

Cordonnier, et al., "The concept of suspicion: a new security model for identification management in smart cards", http://inforge.unil.ch/isdss97/papers/48.htm, (1997).

de Kerf, B. et al., "N-Count Fast, Low-Cost Secure Payments using Smart Cards", QC Technology, Version 1.1, Feb. 1997, 8 pages.

Anderson et al., "A New Family of Authentication Protocols", Cambridge University Computer Laboratory, England, 13 pages.

Dreifus, H., Smart Cards; A Guide to Building and Managing Smart Card Applications; Copyright 1998; Publisher Robert Ipsen "Smart Card Development Skills, Methods, and Tools"; pp. 159-176; 224-225.

Goldreich, Oded, "The Foundations of Modern Cryptography", May 2, 1998, Department of Computer Science and Applied Mathematics, Version Nr. 3.1, pp. 0-41.

Heiss, J. et al., "Java Card™ Technology Grows Up Smart", printed on Apr. 22, 2000 at http://java.sum.com/features/1990/01/javacard.html, 5 pages.

Islam, N. et al., "A Flexible Security Model for Using Internet Content", IMB Thomas J. Watson Research Center Papers, 'Online!', Jun. 28, 1997.

"Kerberos: The Network Authentication Protocol", printed on Jan. 9, 2002 from http://web.mit.edu/kerberos/www/.

Naor, et al., "Universal One-Way Hash Functions and Their Cryptographic Applications", Mar. 13, 1995, pp. 0-14.

Thomas David, J., "Smart and Smarter: The Emergence of Java Card™ Technology", printed on Apr. 22, 2000 from http://java/sun.com/features/1998/04/javacard.html, pp. 1-8.

Sun Microsystems, Inc., "Smart Cards: A primer", printed on Apr. 22, 2000 from http://www.javaworld.com/javaworld/jw-12-19_b97/f_jw-12-javadev_p.html, pp. 1-13.

R. Rivest, "*The MD4 Message Digest Algorithm*", Request for Comments (RFC) 1320, MIT Laboratory for Computer Science and RSA Data Security, Inc., Apr. 1992, pp. 1-20.

R. Rivest, "*The MD5 Message-Digest Algorithm*", Request for Comments (RFC) 1321 MIT Laboratory for Computer Science and RSA Data Security, Inc., Apr. 1992.

"*Secure Hash Standard*", Federal Information Processing Standard Publication 180-1, Apr. 17, 1995.

"*Smart Card Stage I Description*", Version 1.1, CDMA Development Group- Smart Card Team Document, May 22, 1996.

"*Digital Cellular Telecommunications Systems (Phase 2+); AT Command Set for GSM Mobile Equipment (ME)*", ETSI TS 100 916 V7.4.0, 1998.

"*Wireless Identity Module Pert: Security*" Version 12, Wireless Application Protocol WAP-260-WIM-20010712-a, Jul. 2001.

"*3rd Generation Partnership Project; Technical Specification Group Terminals; USIM and IC Card Requirements (Release 4)*", 3GPP TS 21.111 V4.0.0, 2001.

"*3rd Generation Partnership Project 2: Removable User Identity Module for Spread Spectum Systems*" 3GPP2 C.S0023-A, Version 1.0, Sep. 13, 2002, pp. 1-1-5-2, A1-A4.

* cited by examiner

METHOD AND APPARATUS FOR PROTECTING AGAINST SIDE CHANNEL ATTACKS AGAINST PERSONAL IDENTIFICATION NUMBERS

CROSS REFERENCE TO RELATED APPLICATIONS

This application is related to the following:

U.S. patent application Ser. No. 10/164,658, filed Jun. 5, 2002 in the name of Eduard de Jong, entitled "Method for Private Personal Identification Number Management", commonly assigned herewith; and U.S. patent application Ser. No. 10/164,490, filed Jun. 5, 2002 in the name of Eduard de Jong, entitled "Apparatus for Private Personal Identification Number Management", commonly assigned herewith.

FIELD OF THE INVENTION

The present invention relates to the field of computer science. More particularly, the present invention relates to a method and apparatus for protecting against side channel attacks on personal identification numbers.

BACKGROUND OF THE INVENTION

The challenge of identifying or authenticating a person on a local computer, or on the other end of a communication session, or in the role of the sender of a message, is a recurring theme in e-business. A typical solution uses user authentication methods based at least in part on passwords or PINs (personal identification numbers). A password or PIN is a word or code used as a security measure against unauthorized access to data. Typically, a user obtains a PIN as part of an enrollment process with a service provider. In this enrollment process, the service provider assesses user-supplied information and decides whether to provide the service to the user. If the service provider decides to provide service, the service provider issues a PIN to the user.

After enrolling with the service provider, the user uses the PIN to obtain access to the service. The user interface in this case consists of a prompt for a PIN. The user is typically allowed a fixed number of unsuccessful PIN attempts before user access is blocked.

A PIN or password is typically the primary means by which an individual user indicates authorization based at least in part on an intelligent thought process performed by the user. The user must recall the PIN from the user's memory and enter the digits corresponding to the PIN to obtain access to a service. PINs are often difficult to remember, especially when a user uses more than one PIN to access different services. A user may create a written copy of the PIN or PINs in an attempt to remember them. However, such a practice degrades security because the paper containing the PIN or PINs can be stolen or forwarded freely. Thus, static PIN-based user authentication mechanisms alone provide a relatively low level of security.

An improved form of user authentication is made possible by using a smart card or a magnetic stripe card in conjunction with a PIN. This is sometimes referred to as "two-factor" user authentication, combining "what you have" (the physical card) with "what you know" (the password needed to use the card). Because both possession of the card and knowledge of the PIN are required, two-factor user authentication can provide a higher level of security than user authentication based at least in part on a PIN or on a card alone.

FIG. 1 is a block diagram that illustrates a typical mechanism for PIN management using a magnetic stripe card. A service provider 150 maintains a centralized cardholder database 110 that includes a primary account number (PAN) and an associated PIN for each cardholder. A cryptographic algorithm is typically used to generate the PIN based at least in part on a cryptographic key 140, the PAN 120 and possibly other data 135. The PAN for a user 100 is written on a magnetic strip card 105 and the card 105 is provided to the user 100. The user 100 gains access to the account associated with a card 105 by presenting the card 105 to a card reader or card acceptance device (CAD) 155 in communication with the centralized cardholder database 110 and by entering a PIN 145. The CAD 155 may be implemented in a PC or as a standalone device. The centralized cardholder database 110 grants user 100 access to the account if the PAN on the card 105 matches a PAN 120 in the database 110 and if the PIN 145 entered by the user 100 matches the PIN 125 that is associated with the PAN 120 in the database 110.

FIG. 2 is a block diagram that illustrates a typical mechanism for personal identification number (PIN) management using a smart card. Unlike a magnetic strip card, a smart card may include a CPU (central processing unit). Such a smart card can process data such as a PIN locally on the card. This processing may include PIN verification. Once a user is authenticated to the card, the card can be used to obtain access to a service. As shown in FIG. 2, smart card 205 includes multiple vendor applications (235, 240, 290), each of which may use the same PIN to control access to a service. Smart card 205 also includes an applet 215 provided by the card issuer. The issuer applet 215 includes PIN comparator 220 that compares PIN 270 entered by a user 200 with a validated PIN 230. Typically, PIN comparator 220 allows a fixed number of unsuccessful PIN tries before access is blocked. This is illustrated below with reference to FIG. 3. Once access is blocked, user 200 must present the card 205 to service provider 280. Service provider 280 maintains information about the smart card 205 that allows the smart card 205 to be reset. In one solution, service provider 280 maintains a "super PIN" that allows the smart card 205 to be reset based at least in part on cryptographic protocols.

Turning now to FIG. 3, a flow diagram that illustrates a method for personal identification number (PIN) management is presented. At 300, a PIN from a user is received. At 305, a determination is made regarding whether a try counter has exceeded a maximum number of try attempts. If the maximum number of try attempts has been exceeded, the card is set to block at 310. If the maximum number of try attempts has not been exceeded, the try counter is incremented at 315 and a determination regarding whether the user-entered PIN matches a validated PIN is made. If the user-entered PIN matches the stored PIN, access is allowed at 325. If the user-entered PIN does not match the validated PIN, additional PIN tries are accepted beginning at 300. This process continues until the maximum number of try attempts has been exceeded.

Unfortunately, maintaining a PIN in a centralized database 105 that is beyond user control makes PINs vulnerable to misuse by a service provider 150. It also makes the PIN vulnerable to attack by rogue software running on the service provider's system.

Cryptographic devices such as smart cards use a secret key to process input information and/or to produce output information. Security protocol designs typically assume that input and output messages are available to attackers, but that other information about the keys is not available. However, side-channel attacks can be used to obtain secret keys and other information stored on a smart card. A side-channel attack employs methods that have little to do with the security concepts underlying a system. For example, encryption focuses on key size and symmetric or public, strong algorithms to protect against brute-force attacks. While these attacks need to be addressed, a cryptographic system can be attacked in other way, from a totally different direction, addressing not the concept but the implementation as well as other parts of the overall system. Looking over a person's shoulder while typing a message that is destined to be encrypted, is one trivial example.

Side-channel attacks against smart cards focus on the processing performed by the card, rather than on the normal communications interface with the smart card. The data analyzed in such attacks may include measurements of power consumption, electromagnetic radiation and processing time. Integrated circuits such as those found in smart cards are built out of individual transistors that act as voltage-controlled switches. Current flows across the transistor substrate when charge is applied to or removed from the gate. This current then delivers charge to the gates of other transistors, interconnect wires, and other circuit loads. The motion of electric charge consumes power and produces electromagnetic radiation, both of which are externally detectable. Therefore, individual transistors produce externally observable electrical behavior. Because microprocessor logic units exhibit regular transistor switching patterns, it is relatively easy to identify macro-characteristics (such as microprocessor activity) by detailed monitoring of power consumption.

In Simple Power Analysis (SPA) attacks, an attacker directly observes a system's power consumption. The amount of power consumed varies depending on the microprocessor instruction performed. At high magnification, individual instructions can be differentiated.

Differential Power Analysis (DPA) is a much more powerful side-channel attack than SPA, and is relatively difficult to prevent. While SPA attacks use primarily visual inspection to identify relevant power fluctuations, DPA attacks use statistical analysis and error correction techniques to extract information correlated to secret keys.

Implementation of a DPA attack involves two phases: Data collection and data analysis. Data collection for DPA may be performed by detailed sampling of a device's power consumption during cryptographic operations as a function of time. Multiple cryptographic operations suspected of using the target key are observed. While the effects of a single transistor switching would be normally be impossible to identify from direct observations of a device's power consumption, the statistical operations used in DPA are able to reliably identify relatively small differences in power consumption.

An improvement is made possible by storing secret information such as PINs in encrypted form. However, the encrypted PIN must be decrypted before in order to compare the decrypted PIN with a user-entered PIN, thus making the decrypted PIN susceptible to side-channel attacks.

A device may be made less susceptible to side-channel attacks by reducing signal sizes, such as by using constant execution path code, choosing operations that leak less information in their power consumption and by physically shielding the device. Unfortunately, such signal size reduction generally cannot reduce the signal size to zero, as an attacker with a sufficiently large number of samples will still be able to perform side-channel attack analysis on the (heavily degraded) signal. Additionally, aggressive shielding can make attacks infeasible. However, such shielding adds significantly to a device's cost and size.

Introducing noise into power consumption measurements may also lessen side-channel attack susceptibility. This may be done by executing random code segments. Like signal size reductions, adding noise increases the number of samples required for an attack, possibly to an infeasibly large number. In addition, execution timing and order can be randomized. However, such modifications typically decrease execution efficiency and make the software code relatively complex, complicating code verification.

Smart cards are also susceptible to card tear. The term "card tear" refers to the removal of a smart card from a CAD before a transaction is complete. In one instance, a card is removed from a CAD before a user authentication transaction is complete (before the user has authenticated himself or herself to the card). In this case, the card is removed after a PIN has been entered but before the card has recorded the result of comparing the entered PIN with a valid PIN stored on the card. This technique typically prevents the card from becoming blocked, thus increasing the possible number of PIN comparison operations and increasing the amount of information susceptible to side channel attacks.

Accordingly, what is needed is a relatively secure user authentication solution that provides relatively limited access to an individual's PIN. Another need exists for such a solution that is relatively inexpensive. Yet a further need exists for such a solution that is relatively insensitive to side-channel attacks. Yet a further need exists for such a solution that is relatively efficient and verifiable.

SUMMARY OF THE INVENTION

A method for private personal identification number (PIN) management includes receiving a first PIN, receiving a first key used to scramble a second PIN that has been validated, receiving a first scrambled PIN comprising the second PIN scrambled with the first key, scrambling the first PIN with the first key to create a second scrambled PIN and validating the first PIN based at least in part on whether the first scrambled PIN matches the second scrambled PIN.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
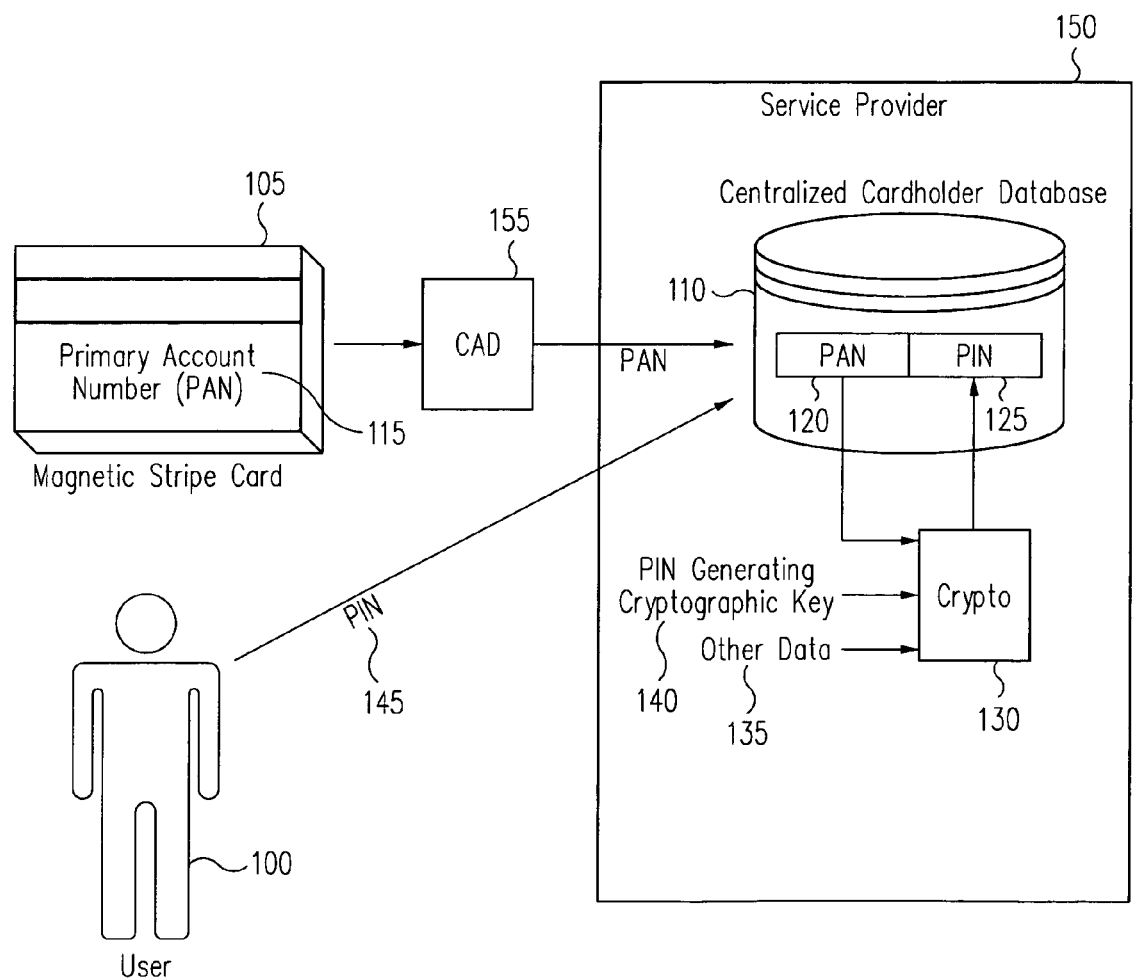
FIG. 1 is a block diagram that illustrates a typical mechanism for personal identification number (PIN) management using a magnetic stripe card.
Figure 2:
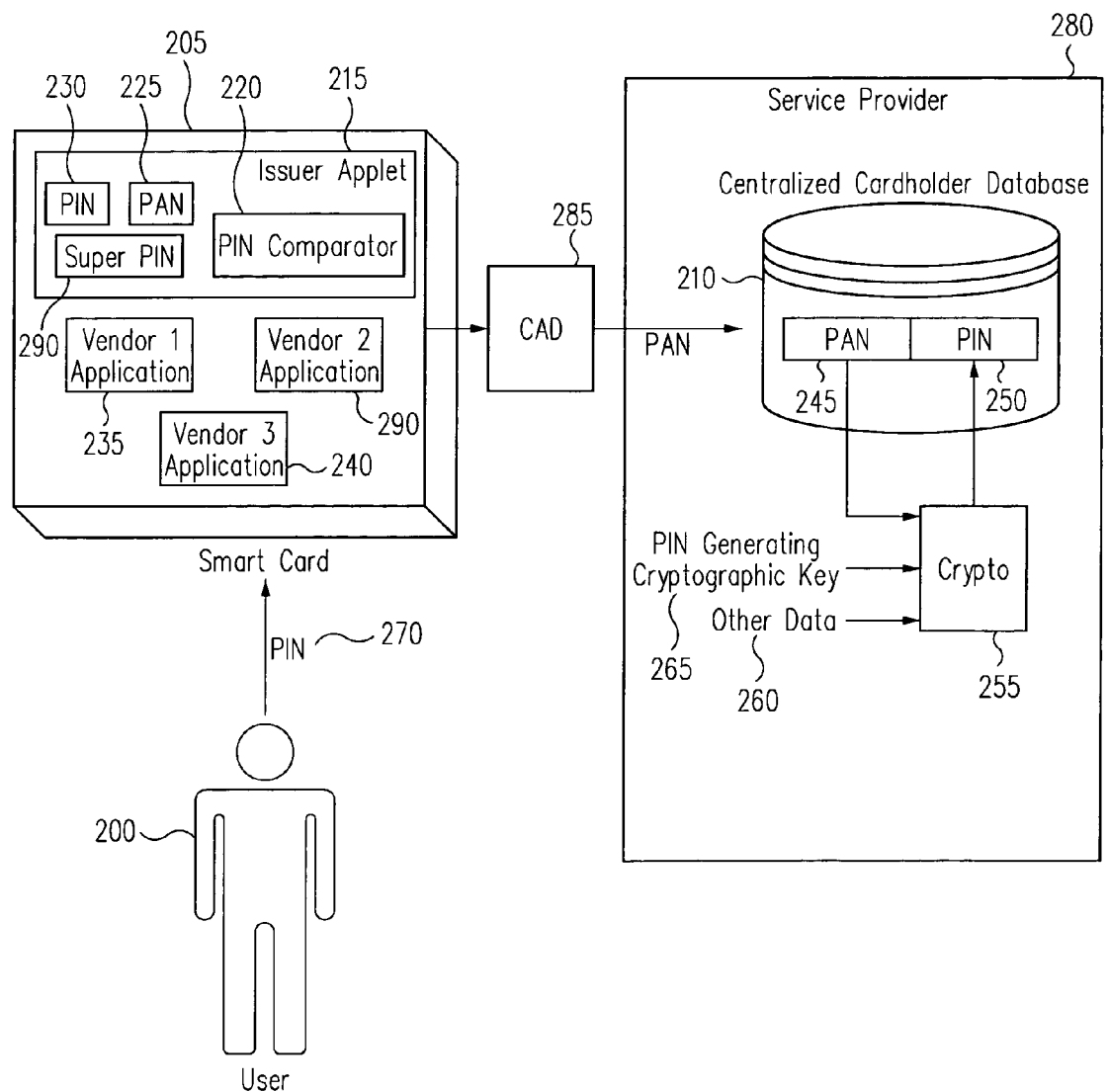
FIG. 2 is a block diagram that illustrates a typical mechanism for PIN management using a smart card.
Figure 3:
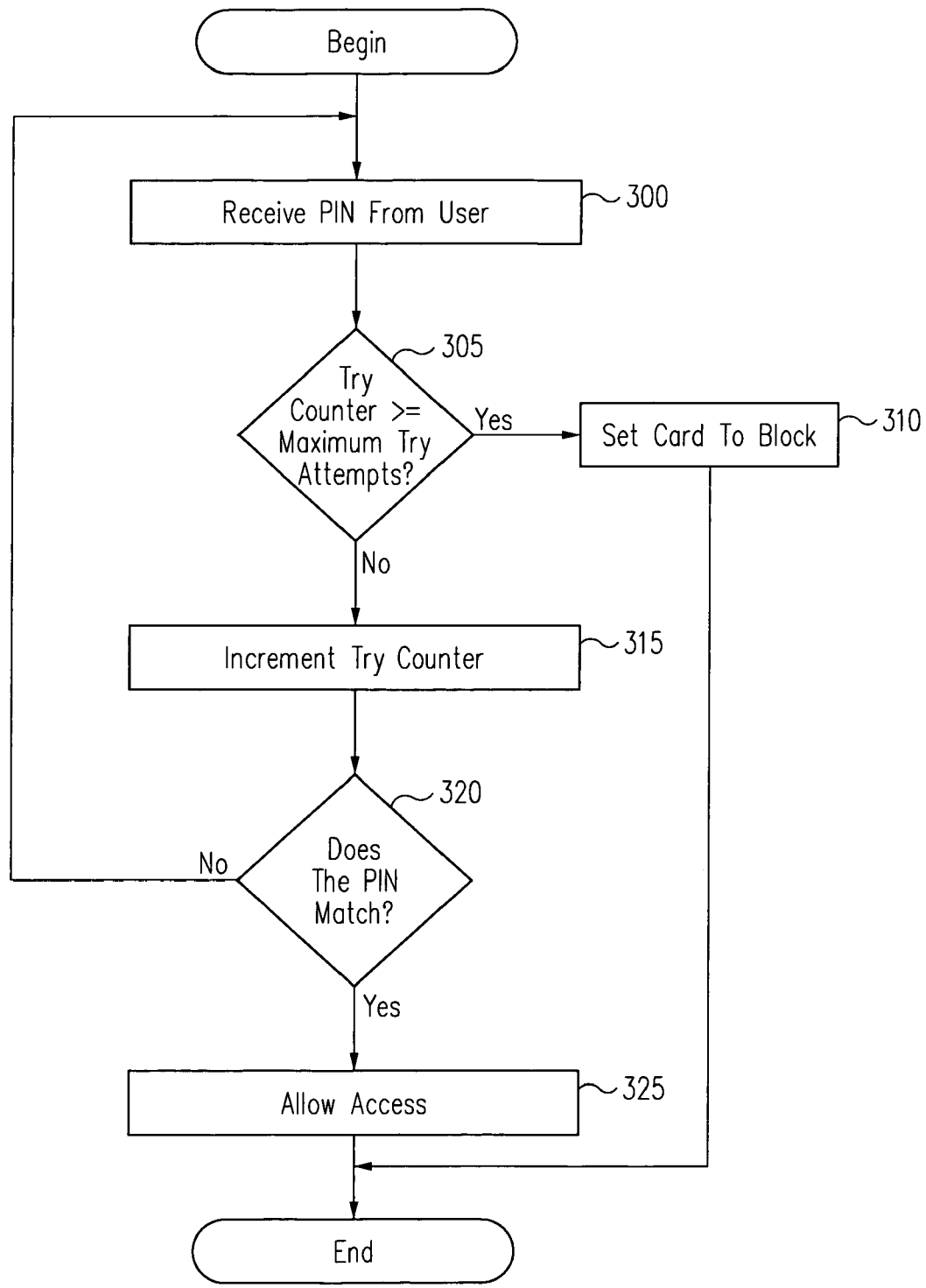
FIG. 3 is a flow diagram that illustrates a method for PIN management.

Embodiments of the present invention are described herein in the context of a method and apparatus for protecting against side channel attacks on personal identification numbers. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "randomized" describes the result of a random or pseudo-random number generation process. A "randomized process" describes the application of such a result to a process. Methods of generating random and pseudo-random numbers are known by those skilled in the relevant art.

In the context of the present invention, the term "session" or "user session" describes a period that begins when a user inserts a secure portable device such as a smart card or the like into a communications device such as a CAD, and ends when the secure portable device is removed from the communications device. A "session ID" is used to describe an identifier that uniquely identifies such a session.

In the context of the present invention, the term "impersistent mutable memory" describes a memory whose contents are both modifiable and affected by whether power is applied to the memory.

In the context of the present invention, the term "persistent mutable memory" describes a memory whose contents are both modifiable and unaffected by whether power is applied to the memory.

In the context of the present invention, the term "persistent immutable memory" describes a memory whose contents both unmodifiable and unaffected by whether power is applied to the memory. The term includes a persistent mutable memory that has been configured to function as a persistent immutable memory.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Palo Alto, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 4:
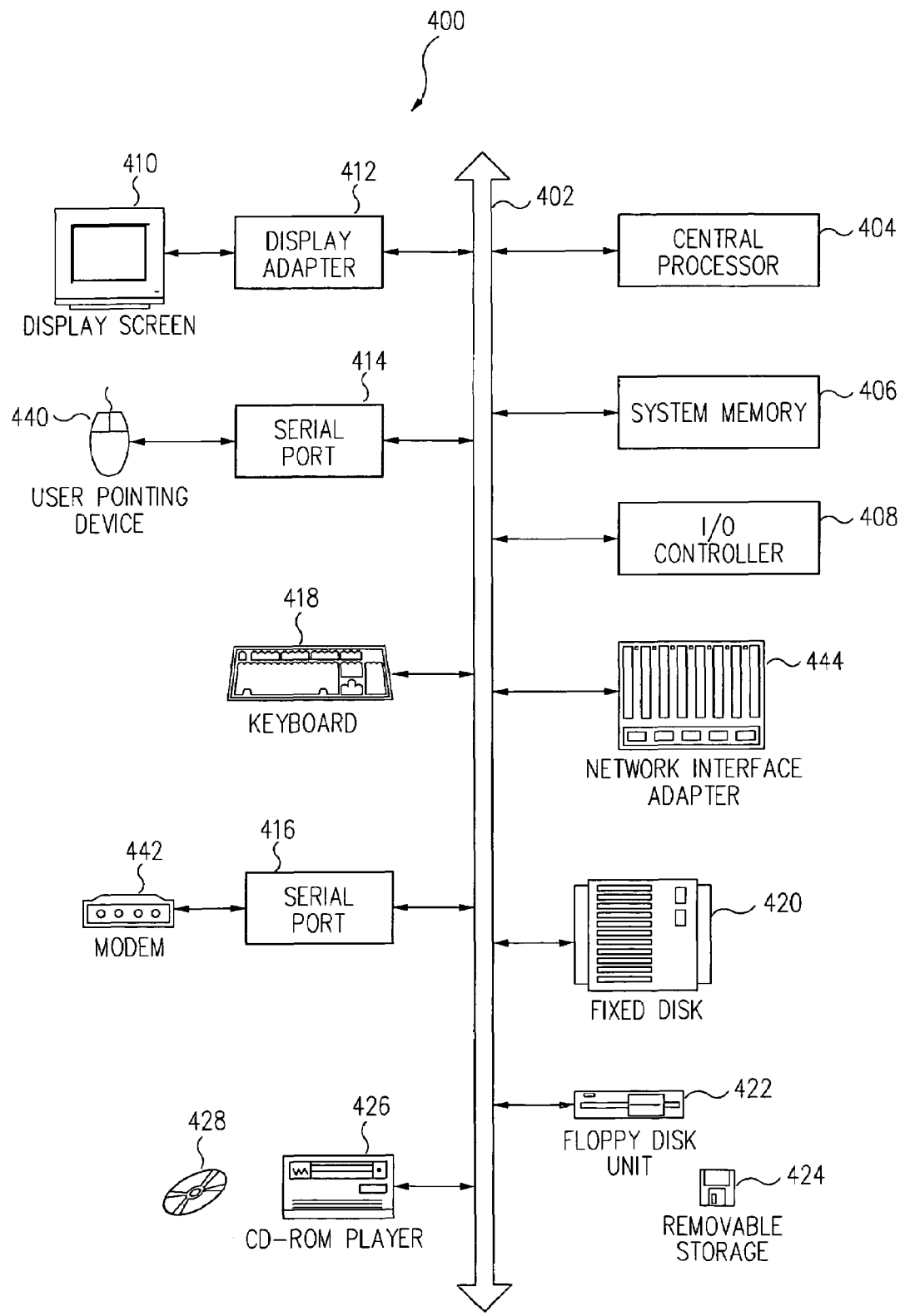
FIG. 4 is a block diagram of a computer system suitable for implementing aspects of the present invention.

FIG. 4 depicts a block diagram of a computer system 400 suitable for implementing aspects of the present invention. As shown in FIG. 4, computer system 400 includes a bus 402 which interconnects major subsystems such as a central processor 404, a system memory 406 (typically RAM), an input/output (I/O) controller 408, an external device such as a display screen 410 via display adapter 412, serial ports 414 and 416, a keyboard 418, a fixed disk drive 420, a floppy disk drive 422 operative to receive a floppy disk 424, and a CD-ROM player 426 operative to receive a CD-ROM 428. Many other devices can be connected, such as a pointing device 430 (e.g., a mouse) connected via serial port 414 and a modem 432 connected via serial port 416. Modem 432 may provide a direct connection to a remote server via a telephone link or to the Internet via a POP (point of presence). Alternatively, a network interface adapter 434 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 4 to be present to practice the present invention, as discussed below. Furthermore, the devices and subsystems may be interconnected in different ways from that shown in FIG. 4. The operation of a computer system such as that shown in FIG. 4 is readily known in the art and is not discussed in detail in this application, so as not to overcomplicate the present discussion. Code to implement the present invention may be operably disposed in system memory 406 or stored on storage media such as fixed disk 420, floppy disk 424 or CD-ROM 428.

Figure 7:
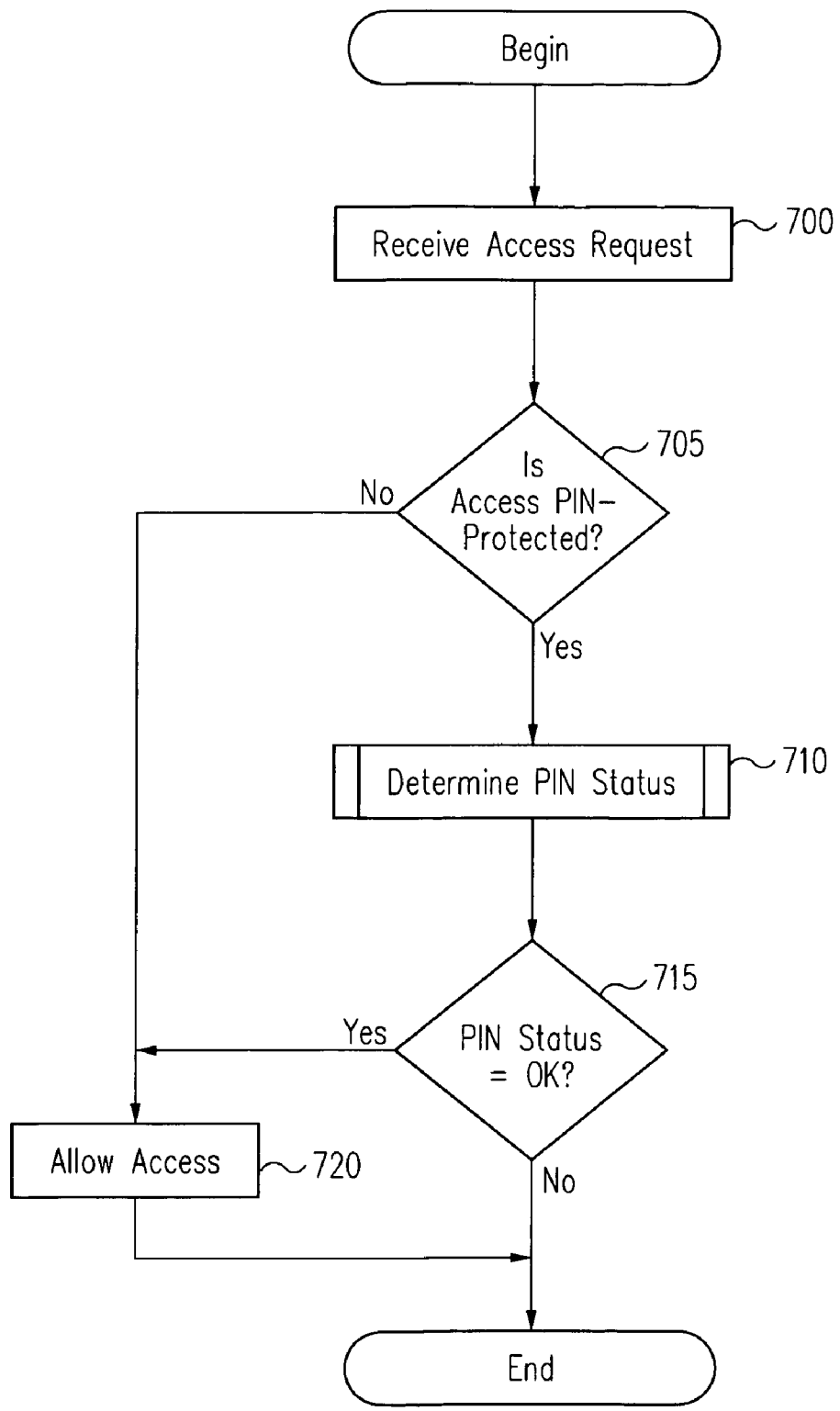
FIG. 7 is a flow diagram that illustrates a method for private PIN management using exponential delay after failed PIN attempts in accordance with embodiments of the present invention.
Figure 8:
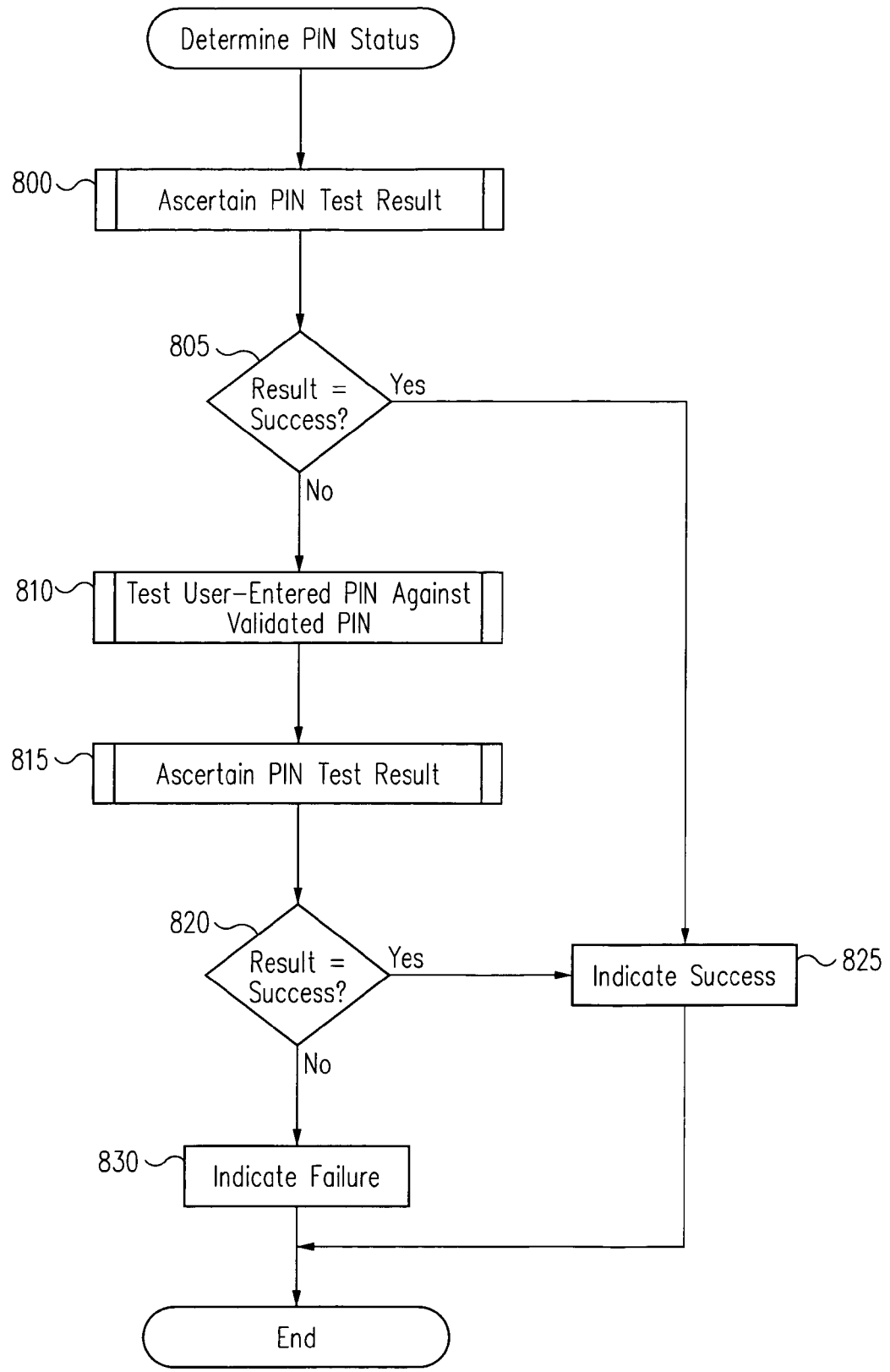
FIG. 8 is a flow diagram that illustrates a method for determining a PIN status in accordance with embodiments of the present invention.

FIGS. 5-34 illustrate various embodiments of the present invention. FIGS. 7 and 8 provide the basic context for embodiments of the present invention that use exponential delays after failed PIN attempts. FIGS. 5-11 illustrate an apparatus and method for private PIN management using exponential delay based at least in part on a stored exponent after failed PIN attempts in accordance with embodiments of the present invention. FIGS. 7-8 in conjunction with FIGS. 12-20 illustrate an apparatus and method for private PIN management using exponential delay that protects against card tear in accordance with embodiments of the present invention. FIGS. 7-8 in conjunction with FIGS. 25-34 illustrate an apparatus and method for private PIN management using exponential delay that protects against card tear and side-channel attacks in accordance with embodiments of the present invention. FIGS. 21-24 illustrate an apparatus and method for private PIN management using scrambled PIN data in accordance with embodiments of the present invention.

According to one embodiment of the present invention, a request for access to a service includes a PIN. The PIN is matched with a validated PIN. If the match is successful, access to the service is granted. If the match is unsuccessful, a delay period elapses before matching another PIN with the validated PIN. The delay period increases with successive unsuccessful matches. According to one embodiment of the present invention, the delay period increases exponentially with successive unsuccessful matches. According to another embodiment of the present invention, the delay period increases linearly with successive unsuccessful matches.

The above discussion regarding linear and exponential increases in the delay period is not intended to be limiting in any way. Those of ordinary skill in the art will recognize that any increasing function may be used.

Figure 5:
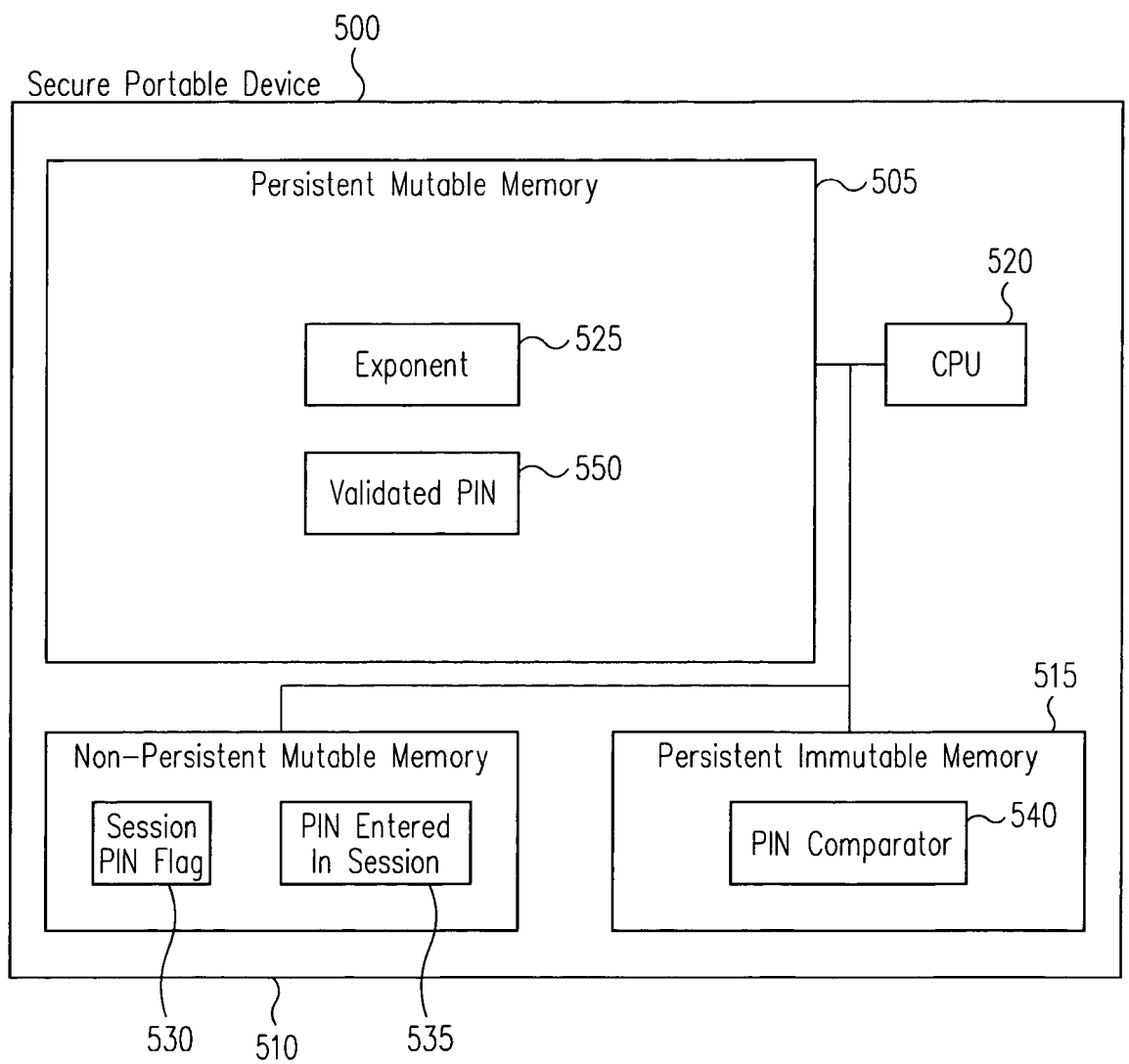
FIG. 5 is a block diagram that illustrates an apparatus for private PIN management using exponential delay based at least in part on a stored exponent after failed PIN attempts in accordance with one embodiment of the present invention.

Turning now to FIG. 5, a block diagram that illustrates an apparatus for private PIN management using exponential delay based at least in part on a stored exponent after failed PIN attempts in accordance with one embodiment of the present invention is presented. Secure portable device 500 may be any trusted portable device such as a mobile phone or a Java Card™ technology-enabled smart card, or the like. Java Card™ technology is described in Z. Chen, Java Card™ Technology for Smart Cards (2000). Secure portable device 500 includes a CPU 520, a persistent mutable memory 505, a non-persistent mutable memory 545 and a persistent immutable memory 515. According to embodiments of the present invention, persistent mutable memory 505, non-persistent mutable memory 545 and persistent immutable memory 515 comprise an EEPROM (electrical erasable programmable read-only memory), a RAM (random access memory) and a ROM (read-only memory), respectively. Persistent mutable memory 505 comprises storage for an exponent value 525 that is incremented with each successive failed PIN comparison and reset after a successful PIN comparison. Exponent 525 also determines the time period to delay after each failed PIN comparison. Persistent mutable memory 505 also comprises storage for a validated PIN 550 whose value must be matched by a user-entered PIN before access to a PIN-protected service is granted. Alternatively, one or more of persistent mutable memory components 525 and 550 may comprise a pointer to an exponent or a validated PIN, respectively. Persistent immutable memory 515 comprises PIN comparator 540 having code that is executed by CPU 520 whenever a user requests access to a service accessed via the secure portable device 500. Non-persistent mutable memory 545 comprises storage for a session PIN flag 530 and a PIN entered during the current session 535.

Many other devices or subsystems (not shown) may be connected in a similar manner. Also, it is not necessary for all of the devices shown in FIG. 5 to be present to practice embodiments of the present invention. Furthermore, the devices and subsystems may be interconnected in different ways from that shown in FIG. 5.

In operation, a user in possession of the secure portable device 500 requests access to a service. The requested service includes anything for which restricted access is desired. By way of example, a requested service may provide access to a range of Internet services via an Internet portal. CPU 520 executes PIN comparator 540 code that checks a session PIN flag 530 that indicates whether a validated PIN has been entered for the current session. If a validated PIN has not been entered for the current session, and if the service is protected by a PIN, PIN comparator 540 compares a PIN entered in the current session 535 with a validated PIN 550. If the PIN 535 and the validated PIN 550 match, access to the service is granted. If the PIN 535 and the validated PIN 550 do not match, PIN comparator 540 denies access, increments an exponent 525 and executes a delay for a time period based at least in part on the exponent 525. Exponent 525 continues to be incremented with each successive failed PIN attempt, causing an exponential increase in the delay. Once the current PIN 535 matches the validated PIN 550, session PIN flag 530 is set to indicate a validated PIN has been entered for the current session, the stored exponent 525 is set to indicate a successful PIN comparison and access to the service is granted.

According to one embodiment of the present invention, secure portable device 500 comprises a smart card.

According to another embodiment of the present invention, secure portable device 500 comprises a Java Card™ technology-enabled smart card.

According to one embodiment of the present invention, secure portable device 300 comprises a CDMA technology-enabled smart card. CDMA technology-enabled smart cards are described in CDMA Development Group Document #43, entitled "Smart Card Stage I Description", Version 1.1, May 22, 1996, available at www.cdg.org.

According to another embodiment of the present invention, secure portable device 300 comprises a SIM (Subscriber Identity Module card) card. The term "SIM card" describes the smart card used in GSM (Global System for Mobile Communications) mobile telephones. The SIM includes the subscriber's personal cryptographic identity key and other information such as the current location of the phone and an address book of frequently called numbers. The SIM is described in "GSM 11.11 —Digital cellular telecommunications system (Phase 2+); Specification of the Subscriber Identity Module-Mobile Equipment (SIM-ME) interface (GSM 11.11)", available at www.etsi.org.

According to another embodiment of the present invention, secure portable device 300 comprises a WIM (Wireless Interface Module). A WIM is a smart card in a WAP (Wireless Application Protocol) phone. It is described in "Wireless Identity Module Specification, available at www.wapforum.org.

According to another embodiment of the present invention, secure portable device 300 comprises a USIM (Universal Subscriber Identity Module). A USIM is a smart card for a 3GPP ($3^{rd}$ Generation Partnership Project) mobile phone. It is described in 3G TS 21.111 Version 4.0.0, USIM and IC Card Requirements, available at www.3gpp.org.

According to another embodiment of the present invention, secure portable device 300 comprises a UIM (User Identity Module). A UIM is a smart card for a 3GPP Project 2 (3GPP2) mobile phone. The term "R-UIM" is used when the smart card is removable. A UIM is a super set of the SIM and allows CDMA (Code Division Multiple Access)-based cellular subscribers to roam across geographic and device boundaries. The R-UIM is described in a specification issued by the 3rd Generation Partnership Project 2 (3GPP2) and entitled "Removable User Identity Module (R-UIM) for cdma2000 Spread Spectrum Systems (3GPP2 C.S0023-0)", Jun. 9, 2000, available at http:/3gpp2.org.

The above description regarding various mobile phone technologies is not intended to be limiting in any way. Those of ordinary skill in the art will recognize that other secure portable devices may be used.

Figure 6:
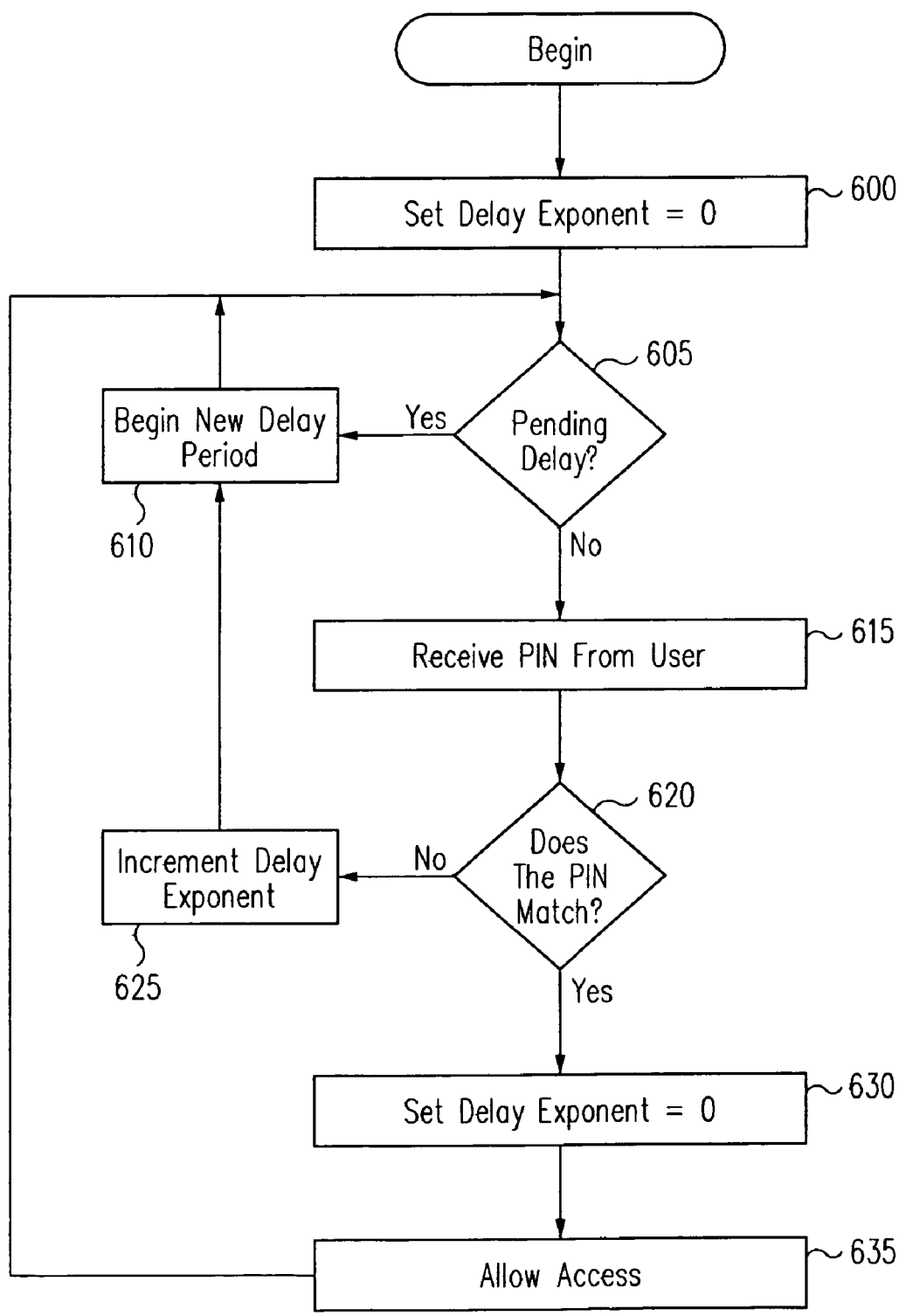
FIG. 6 is a flow diagram that illustrates a method for private PIN management using exponential delay based at least in part on a stored exponent after failed PIN attempts in accordance with one embodiment of the present invention.

Turning now to FIG. 6, a flow diagram that illustrates a method for private PIN management using exponential delay based at least in part on a stored exponent after failed PIN attempts in accordance with one embodiment of the present invention is presented. At 600, a delay exponent is initialized to 0. At 605, a determination is made regarding whether a delay is pending. If a delay is pending, a new delay period is initiated at 610 and processing continues at 605. The new delay period is based at least in part on the current exponent value. If no delay is pending, a PIN entered by a user is received at 615. At 620, a determination is made regarding whether the PIN matches a validated PIN. If the PIN does not match the validated PIN, the delay exponent is incremented at 625 and a new delay period is initiated at 610. If the PIN matches the validated PIN, the delay exponent is reset to 0 at 630 and access to a PIN-protected resource is allowed at 635. According to one embodiment of the present invention, processing is delayed for a time period based at least in part on the exponent before receiving another PIN from a user at 615 when the PIN does not match the validated PIN. According to another embodiment of the present invention, processing is delayed for a period of time based at least in part on the exponent before determining whether another user-entered PIN matches the validated PIN at 620 if the PIN does not match the validated PIN.

Turning now to FIG. 7, a flow diagram that illustrates a method for private PIN management using exponential delay after failed PIN attempts in accordance with embodiments of the present invention is presented. At 700, an access request is received. The access request may include a PIN used to request access to a service. Alternatively, a user may be prompted for a PIN if the service is PIN-protected. At 705, a determination is made regarding whether access to the service is PIN-protected. If the service is not PIN-protected, access is allowed at 720. If the service is PIN-protected, the PIN status is determined at 710. If the PIN status is acceptable, access to the service is allowed at 720.

Turning now to FIG. 8, a flow diagram that illustrates a method for determining a PIN status in accordance with embodiments of the present invention is presented. FIG. 8 provides more detail for reference numeral 710 of FIG. 7. At 800, a PIN test result is ascertained. A PIN test result may be set by a previous PIN status determination. At 805, a determination is made regarding whether the result indicates a successful PIN test. If the result indicates a successful PIN test, a successful PIN status is indicated at 825. If the result indicates an unsuccessful PIN test, at 810 a user-entered PIN is tested against a validated PIN. At 815, the PIN test result is ascertained a second time. If the result indicates a successful PIN test, a successful status is indicated at 825. If the result indicates an unsuccessful PIN test, a failure status is indicated at 830.

Figure 9:
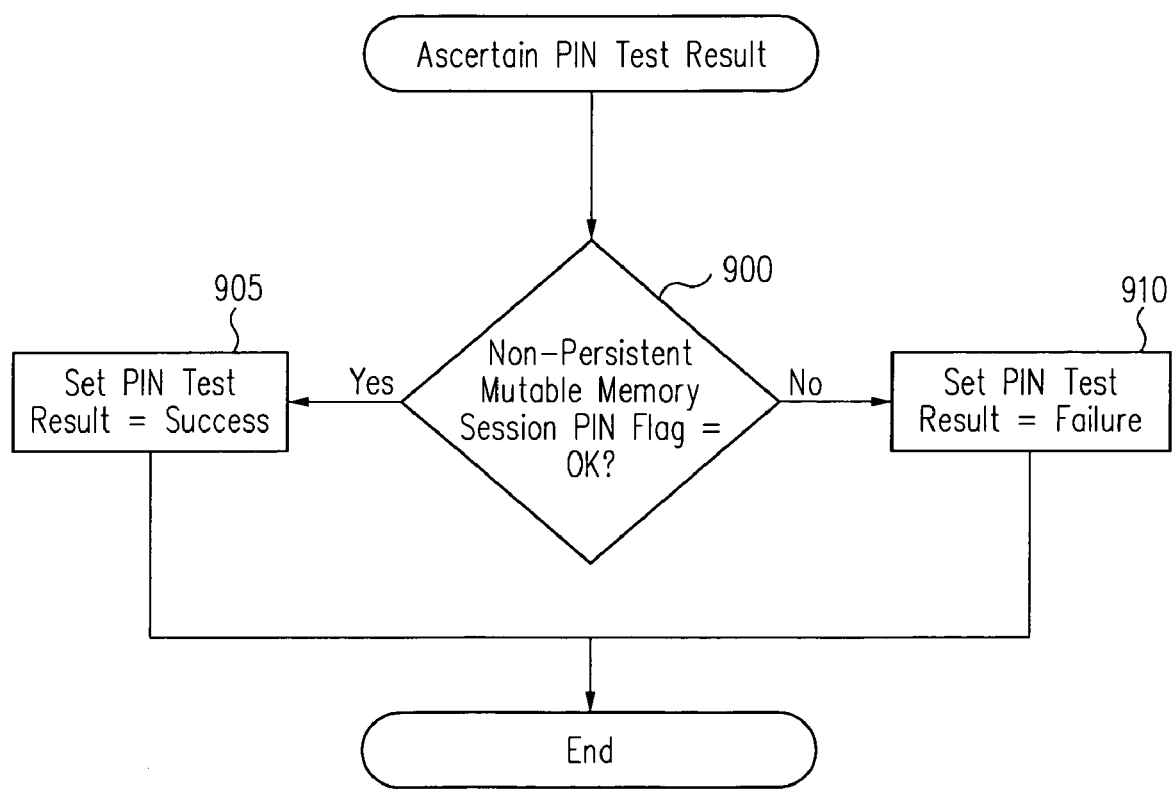
FIG. 9 is a flow diagram that illustrates a method for ascertaining a PIN test result in accordance with one embodiment of the present invention.

Turning now to FIG. 9, a flow diagram that illustrates a method for ascertaining a PIN test result in accordance with one embodiment of the present invention is presented. FIG. 9 provides more detail for reference numerals 800 and 815 of FIG. 8. At 900, a determination is made regarding whether a session PIN flag indicates success. The PIN test result flag is set at 905 and 910 based at least in part on the session PIN flag. According to one embodiment of the present invention, the session PIN flag is stored in a non-persistent mutable memory such as a RAM. Storage of the session PIN flag in such a memory ensures that the flag is reset automatically whenever power is applied. Thus, if a PIN check succeeds, the session PIN flag will indicate success while a smart card is in a communications device such as a CAD or the like. Reinserting a smart card will cycle power to the card, resetting the session PIN flag, causing the PIN test result to indicate a failure and thus requiring the user to enter a PIN once again.

Figure 10:
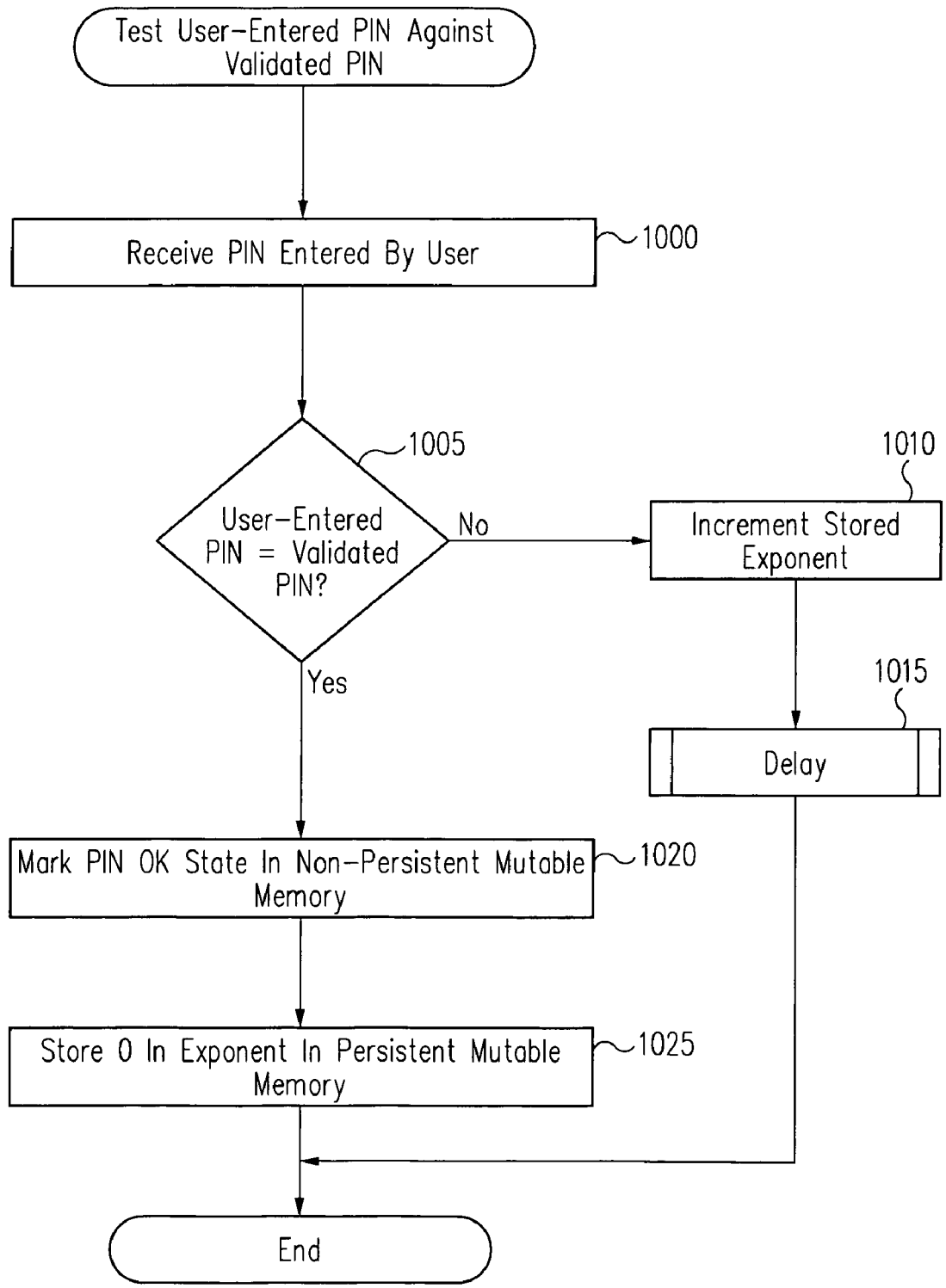
FIG. 10 is a flow diagram that illustrates a method for testing a user-entered PIN against a validated PIN in accordance with one embodiment of the present invention.

Turning now to FIG. 10, a flow diagram that illustrates a method for testing a user-entered PIN against a validated PIN in accordance with one embodiment of the present invention is presented. FIG. 10 provides more detail for reference numeral 810 of FIG. 8. At 1000, a PIN entered by a user is received. The PIN may have been included in the access request. If the PIN was not included with the access request, the secure portable device may prompt for a user-entered PIN. At 1005, a determination is made regarding whether the user-entered PIN matches a validated PIN. If the received PIN matches the validated PIN, the session PIN flag is marked in non-persistent mutable memory at 1020 and the value "0" is stored in an exponent variable in persistent mutable memory at 1025. Writing the value "0" for the exponent variable indicates the last PIN comparison was successful. According to one embodiment of the present invention, the persistent mutable memory comprises an EEPROM. If the user-entered PIN does not match the validated PIN, the stored exponent is incremented at 1010 and PIN processing is delayed at 1015. The time of the delay is based at least in part on the value of the exponent.

Figure 11:
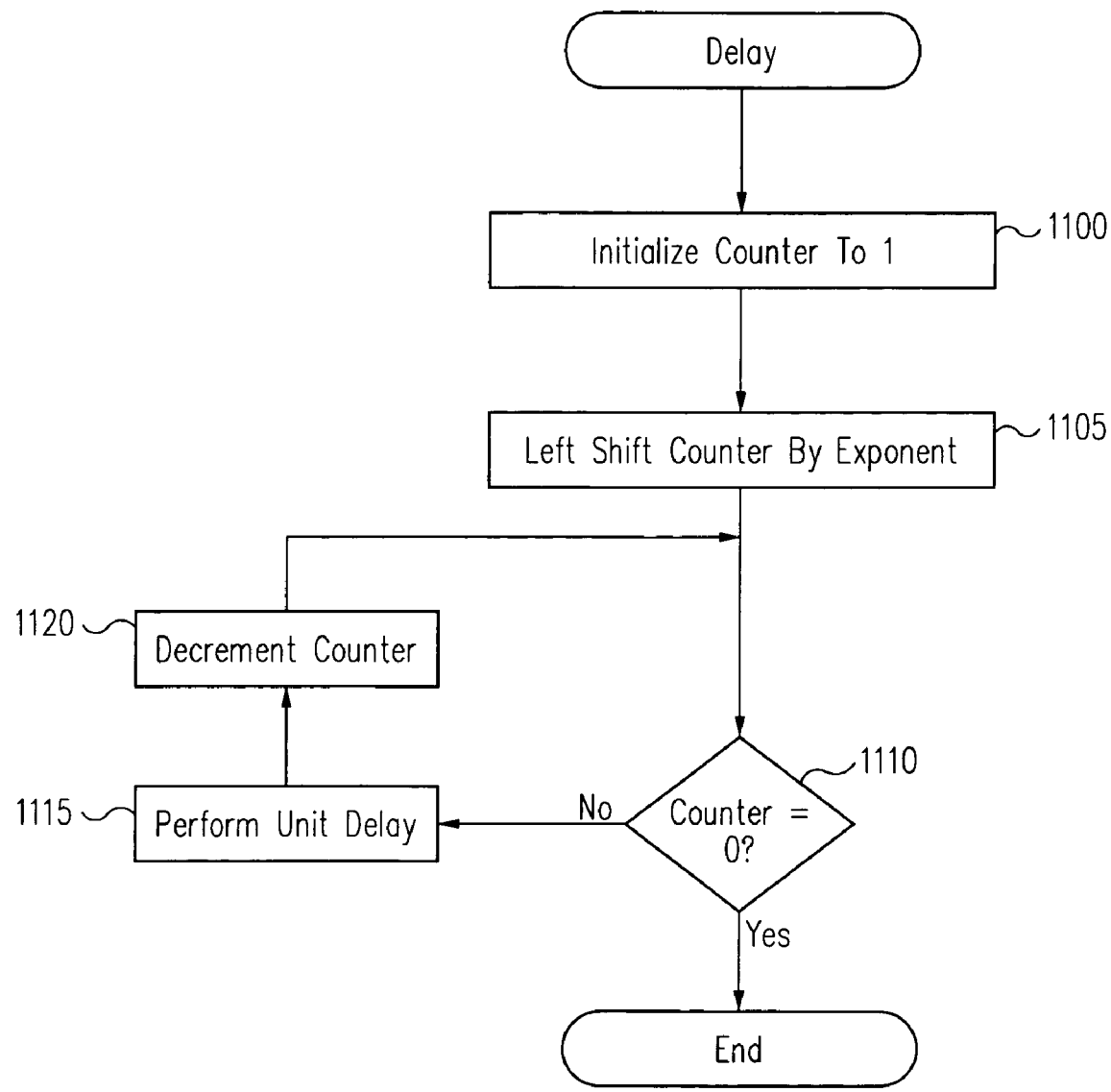
FIG. 11 is a flow diagram that illustrates a method for delaying after a failed PIN attempt in accordance with one embodiment of the present invention.

Turning now to FIG. 11, a flow diagram that illustrates a method for delaying after a failed PIN attempt in accordance with one embodiment of the present invention is presented. FIG. 11 provides more detail for reference numeral 1015 of FIG. 10. At 1100, a counter is initialized to 1. At 1105, the counter is left-shifted based at least in part on the value of the exponent. Upon each left-shift operation, the least significant bit of the counter is populated with the value "0", resulting in a counter value equal to $2^{(x-1)}$, where "x" is the exponent value. At 1110, a determination is made regarding whether the counter equals 0. If the counter equals 0, the delay has been completed. If the counter does not equal 0, a unit delay is performed at 1115. According to one embodiment of the present invention, performing a unit delay comprises executing a sequence of instructions selected based at least in part on the time required to execute the sequence of instructions. At 1120, the counter is decremented and processing continues at 1110. This process continues until the counter equals 0.

According to another embodiment of the present invention, upon each left-shift operation, the least-significant bit of the counter is populated with the value "1", resulting in a counter value equal to $2^x-1$, where "x" is the exponent value.

FIGS. 12-21 illustrate an apparatus and method for private PIN management using exponential delay that protects against card tear in accordance with embodiments of the present invention. A circular buffer is used to record both PIN attempts and the corresponding results of the PIN attempts. A PIN attempt is recorded before the comparison is performed. The recorded information includes at least an exponent that is used to determine a time period to delay after an unsuccessful PIN attempt. The algorithm ensures that a delay cannot be circumvented by physically removing a secure portable device such as a smart card from a communications device such as a CAD or the like before the PIN comparison and possible ensuing delay has been completed.

Figure 12:
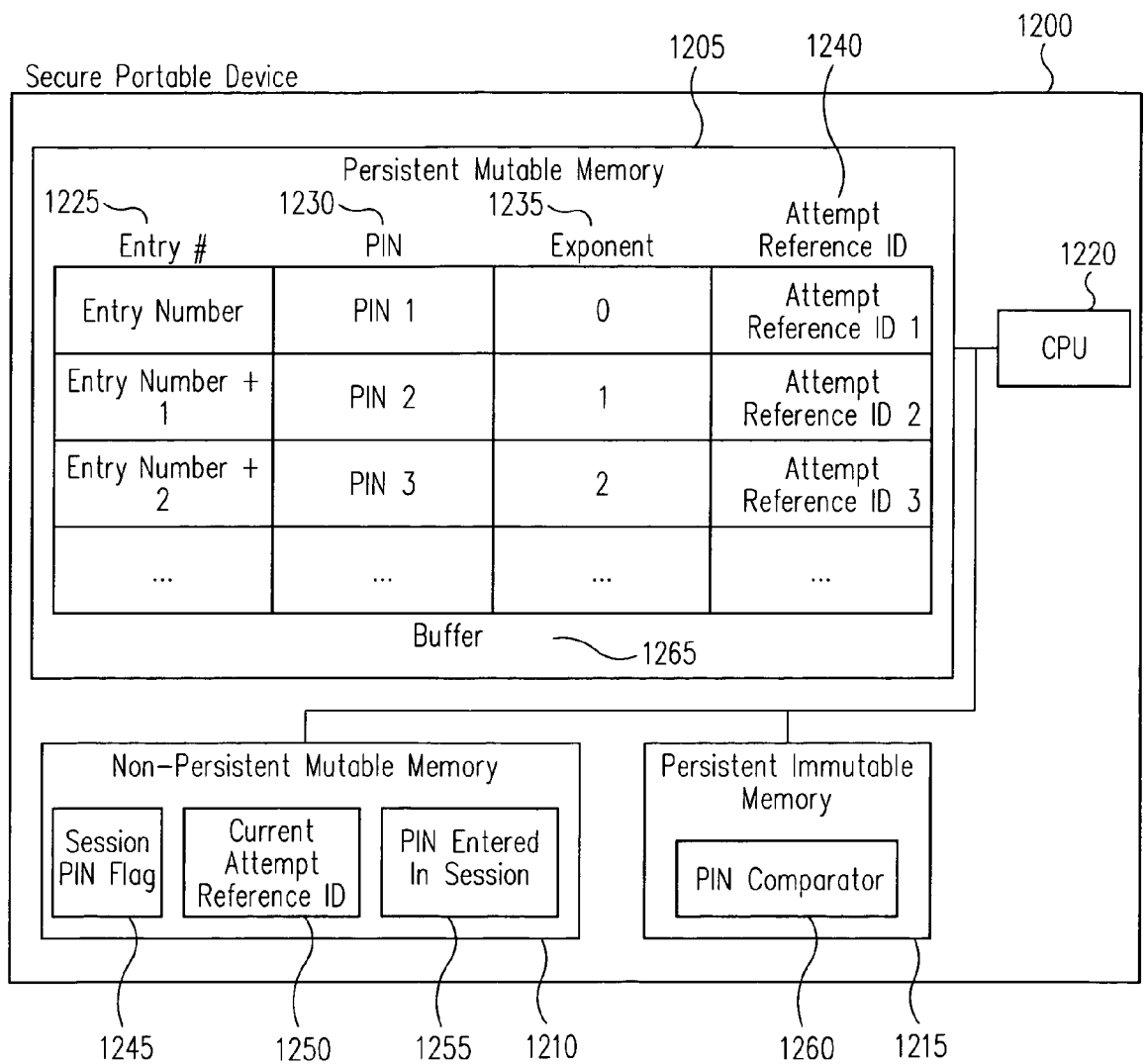
FIG. 12 is a block diagram that illustrates an apparatus for private PIN management using exponential delay that protects against card tear in accordance with one embodiment of the present invention.

Turning now to FIG. 12, a block diagram that illustrates an apparatus for private PIN management using exponential delay that protects against card tear in accordance with one embodiment of the present invention is presented. Secure portable device 1200 may be any trusted portable device such as a mobile phone or a Java Card™ technology-enabled smart card, or the like. Secure portable device 1200 includes a CPU 1220, a persistent mutable memory 1205, a non-persistent mutable memory 1210 and a persistent immutable memory 1215. According to embodiments of the present invention, persistent mutable memory 1205, non-persistent mutable memory 1210 and persistent immutable memory 1215 comprise an EEPROM, a RAM and a ROM, respectively. Persistent mutable memory 1205 comprises storage for a buffer 1265 that includes two or more entries. Each entry comprises an entry number 1225, a PIN 1230, an exponent 1235 and an attempt reference ID 1240. Alternatively, one or more of entry components 1225, 1230, 1235 and 1240 may comprise a pointer to an entry number, PIN, exponent or attempt reference ID, respectively.

Still referring to FIG. 12, the entry number 1225 indicates when the corresponding entry was stored relative to other entries in the buffer 1265. By way of example, if increasing entry numbers are used, a first entry having an entry number that is lower than a second entry number indicates the second entry was stored after the first entry. The exponent 1235 comprises a number that is used to determine a time period to delay before checking another user-entered PIN after a failed PIN attempt. Exponent 1235 is incremented with each successive failed PIN comparison and reset after a successful PIN comparison. Attempt reference ID 1240 comprises an identifier that refers to the session associated with the entry. Persistent immutable memory 1215 comprises PIN comparator 1260 having code that is executed by CPU 1220 whenever a user requests access to a service accessed via the secure portable device 1200. Non-persistent mutable memory 1210 comprises storage for a session PIN flag 1245, a current attempt reference ID 1250 and a PIN entered during the current session 1255.

Many other devices or subsystems (not shown) may be connected in a similar manner. Also, it is not necessary for all of the devices shown in FIG. 12 to be present to practice embodiments of the present invention. Furthermore, the devices and subsystems may be interconnected in different ways from that shown in FIG. 12. Additionally, many data structures such as a record structure or the like may be used to represent an entry in embodiments of the present invention.

In operation, a user in possession of the secure portable device 1200 requests access to a service. The requested service includes anything for which restricted access is desired. By way of example, a requested service may provide access to a range of Internet services via an Internet portal. CPU 1220 executes PIN comparator 1260 code that checks a session PIN flag 1245 that indicates whether a validated PIN has been entered for the current session. If a validated PIN has not been entered for the current session, and if the service is protected by a PIN, PIN comparator 1260 indicates a PIN comparison attempt has begun by initializing a new buffer entry with the PIN value received from the user, incrementing the exponent of the new entry and storing the new entry. PIN comparator 1260 then compares a PIN entered in the current session 1255 with the PIN of the buffer entry that represents the last successful PIN attempt. If the two PINs match, access to the service is granted, the last buffer entry is copied to a new entry, the exponent of the new entry is set to 0 to indicate a successful match and the entry is stored. If the two PINs do not match, PIN comparator 1260 continues to delay for a time period based at least in part on the exponent of the new entry and records an unsuccessful PIN attempt by storing a new entry that is a copy of the last buffer entry. The exponent of buffer entries continues to be incremented with each successive failed PIN attempt, causing an exponential increase in the delay.

According to another embodiment of the present invention, each entry in buffer 1265 comprises an entry number 1225, a PIN 1230 and an exponent 1235, and the determination regarding whether a validated PIN has been entered for the current session is made by examining the session PIN flag 1245 in non-persistent mutable memory 1210. Mapping the default value of the flag upon initialization to "False" ensures that a PIN comparison will be required for a new session.

According to embodiments of the present invention, secure portable device 1200 comprises a CDMA technology-enabled smart card, a SIM card, a WIM, a USIM, a UIM, a R-UIM or the like.

According to embodiments of the present invention, the exponent of an attempt entry is initialized to 1 at the beginning of a PIN comparison that follows a successful PIN comparison. After the PIN comparison, a corresponding result entry is created by copying the attempt entry and storing it in the buffer. If the PIN comparison was successful, the exponent value of the result entry is set to 0. If the PIN comparison was unsuccessful, the result entry is the same as the corresponding attempt entry. Thus, an exponent value of 0 in the last buffer entry indicates the last PIN comparison completed successfully. If the exponents of the last two buffer entries are the same, the last PIN comparison completed with a failed status. If the exponents of the last two buffer entries are not the same, a PIN comparison is in progress.

Figure 13A:
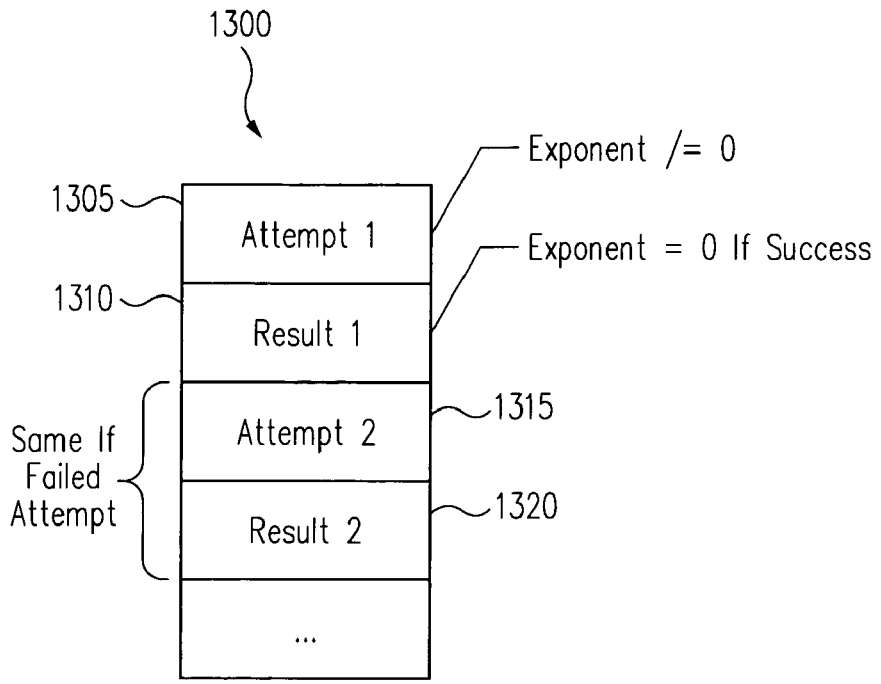
FIG. 13A is a block diagram that illustrates a data structure including an entry comprising two PIN attempts and corresponding PIN compare results in accordance with one embodiment of the present invention.

Turning now to FIG. 13A, a block diagram that illustrates a data structure including an entry comprising two PIN attempts and corresponding PIN compare results in accordance with one embodiment of the present invention is presented. Buffer 1300 includes buffer entries 1305, 1310, 1315 and 1320. Buffer entry 1300 is initialized with a result entry comprising an exponent value of "0" and a validated PIN entered by a user (not shown in FIG. 13A). As shown in FIG. 13A, buffer entry 1305 was stored to mark the beginning of a first PIN comparison and buffer entry 1310 indicates the result of the first PIN comparison. Likewise, buffer entry 1315 was stored to mark the beginning of a second PIN comparison and buffer entry 1320 indicates the result of the second PIN comparison. If the exponent of buffer entry 1320 is 0, the PIN comparison was successful. If the exponent of buffer entry 1320 equals the exponent of buffer 1315, the PIN comparison failed.

Figure 13B:
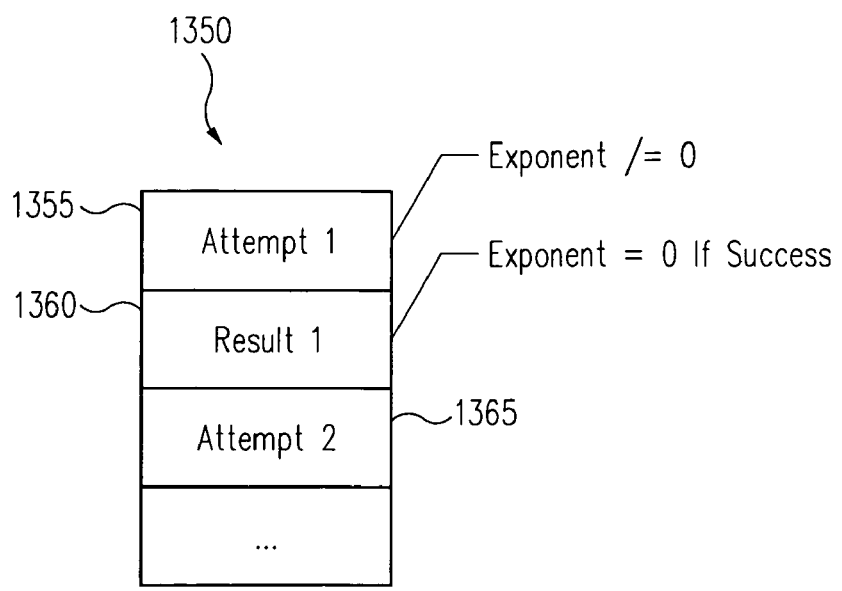
FIG. 13B is a block diagram that illustrates a data structure including an entry comprising two PIN attempts and a single PIN compare result in accordance with one embodiment of the present invention.

FIG. 13B is a block diagram that illustrates the same data structure as FIG. 13A, except only one of the PIN compare attempts has a corresponding PIN compare result. Buffer entry 1350 represents a case where a PIN compare attempt has not been completed. This is indicated when the exponent of the last buffer entry 1365 is nonzero and does not equal the exponent of the next-to-last buffer entry 1360.

Figure 14:
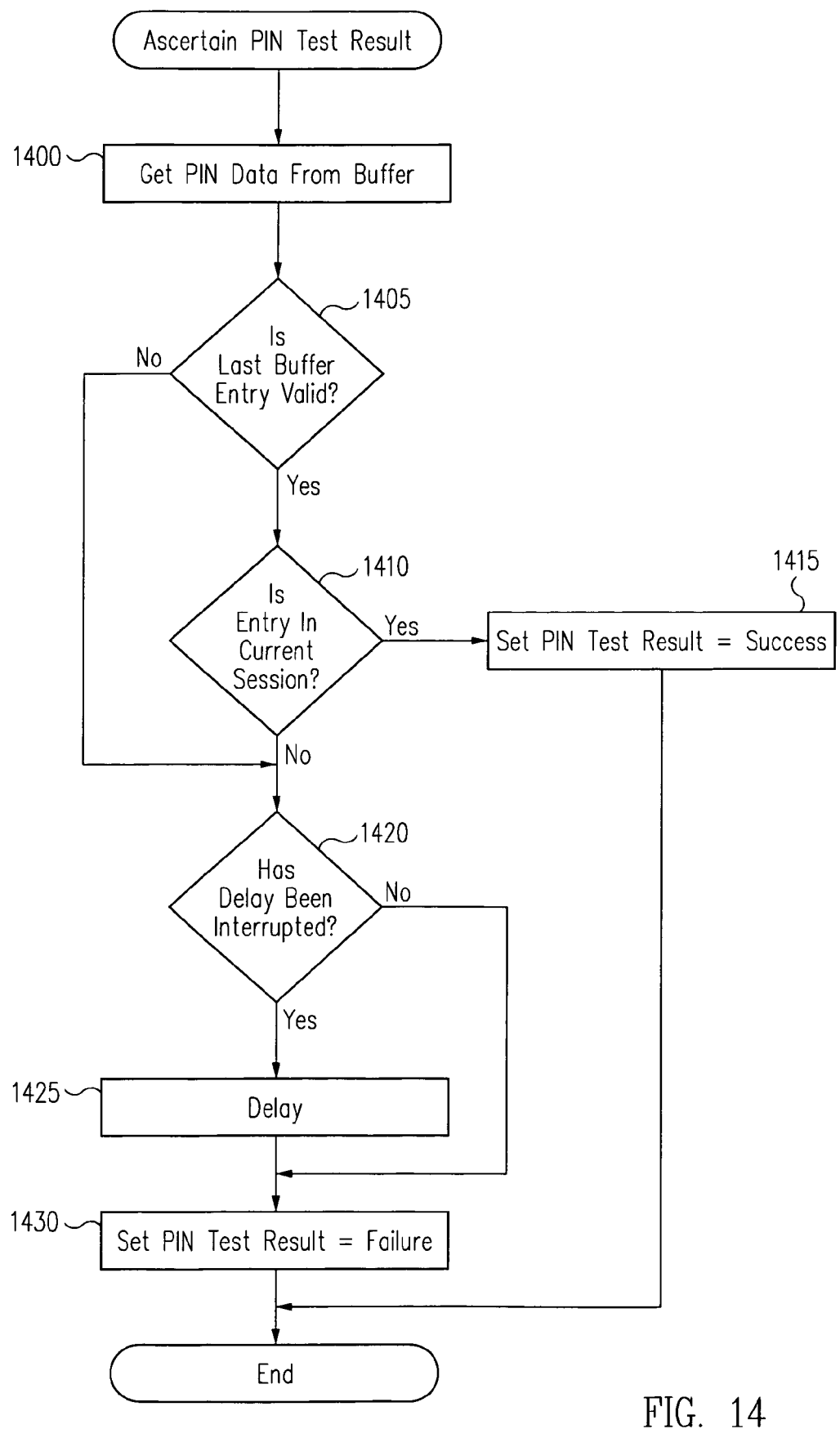
FIG. 14 is a high-level flow diagram that illustrates a method for ascertaining a PIN test result in accordance with one embodiment of the present invention.
Figure 15:
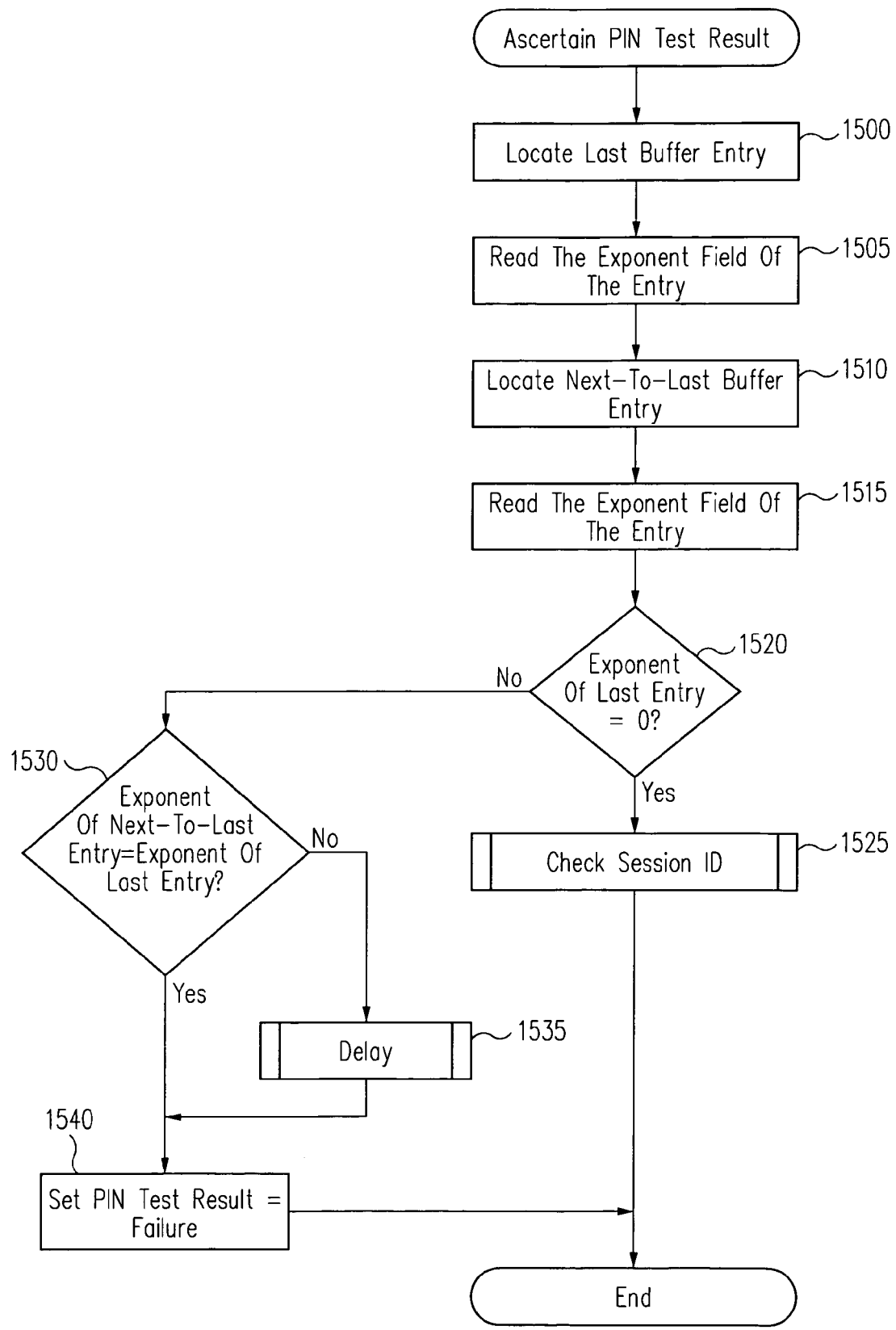
FIG. 15 is a low-level flow diagram that illustrates a method for ascertaining a PIN test result in accordance with one embodiment of the present invention.

FIGS. 14 and 15 are flow diagrams that illustrate a method for ascertaining a PIN test result in accordance with embodiments of the present invention. FIG. 14 illustrates the process at a relatively high level of functionality. FIG. 15 illustrates the same process using the data structures depicted in FIG. 12.

Turning now to FIG. 14, a high-level flow diagram that illustrates a method for ascertaining a PIN test result in accordance with one embodiment of the present invention is presented. FIG. 14 provides more detail for reference numerals 800 and 815 of FIG. 8. At 1400, PIN data from the two latest entries in the buffer are obtained. At 1405, a determination is made regarding whether the last buffer entry is valid. If the last buffer entry is valid, at 1410 a determination is made regarding whether the same entry is associated with the current session. If the entry is associated with the current session, a successful PIN test result is indicated at 1415. If the last buffer entry is invalid, or if the last buffer entry is not associated with the current session, at 1420 a determination is made regarding whether a delay that resulted from a previous unsuccessful PIN attempt has been interrupted. If no delay has been interrupted, an unsuccessful PIN test result is indicated at 1430. If a delay has been interrupted, the delay is repeated at 1425 and an unsuccessful PIN test result is indicated at 1430.

Turning now to FIG. 15, a low-level flow diagram that illustrates a method for ascertaining a PIN test result in accordance with one embodiment of the present invention is presented. FIG. 15 provides more detail for reference numerals 800 and 815 of FIG. 8. At 1500, the last buffer entry is located. At 1505, the exponent field of the entry is read. At 1510, the next-to-last buffer entry is located. At 1515, the exponent field of the next-to-last buffer entry is read. At 1520, a determination is made regarding whether the exponent of the last entry equals 0. If the exponent of the last entry equals 0, at 1525 the session ID of the last entry is checked to determine whether it is associated with the same session as the current session. If the exponent of the last entry does not equal 0, at 1530 a determination is made regarding whether the exponent of the next-to-last entry equals the exponent of the last entry. If the exponent of the next-to-last entry does not equal the exponent of the last entry, a delay is performed at 1535. At 1540, PIN test failure is indicated.

The order of the actions performed in FIG. 15 is not intended to be limiting in any way. Those of ordinary skill in the art will recognize that order may be changed. By way of example, actions 1500 and 1505 may be performed after actions 1510 or 1515. Additionally, action 1500 and 1510 may be performed before actions 1505 or 1515.

Figure 16:
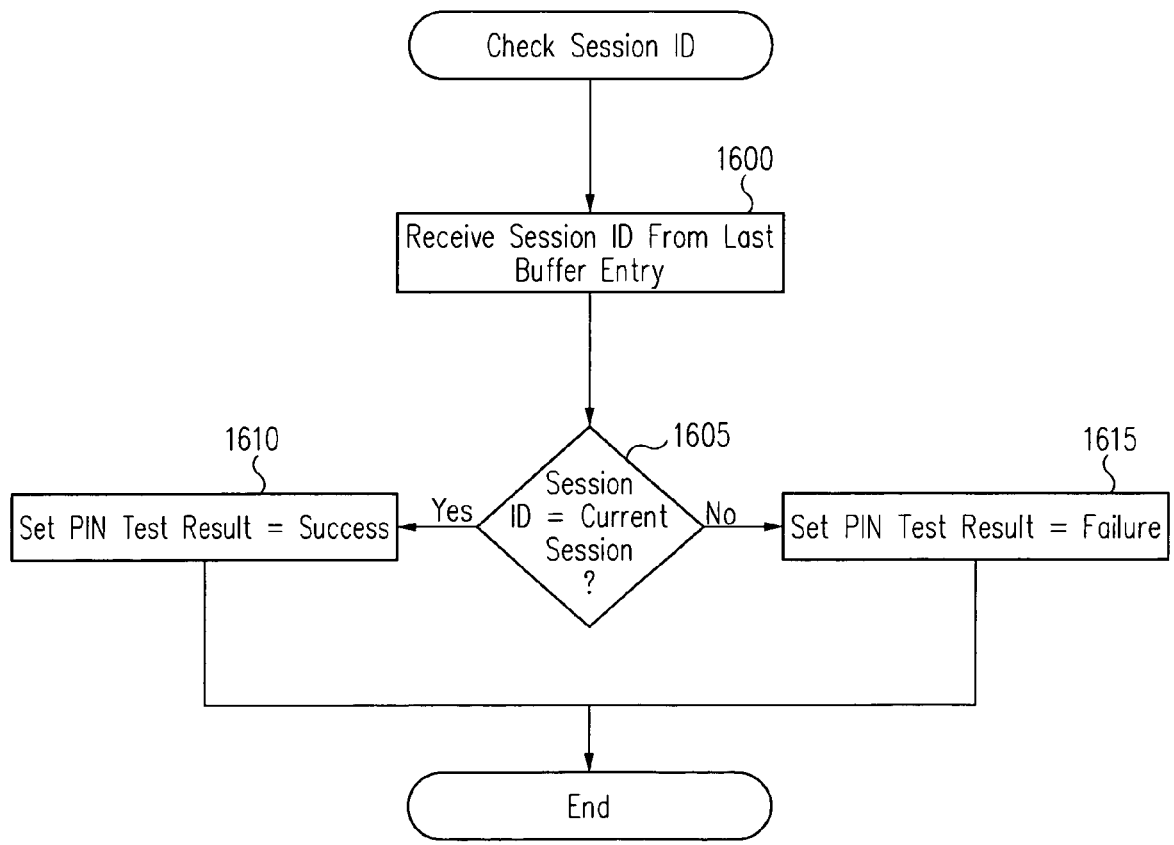
FIG. 16 is a flow diagram that illustrates a method for checking a session identifier in accordance with one embodiment of the present invention.

Turning now to FIG. 16, a flow diagram that illustrates a method for checking a session identifier in accordance with one embodiment of the present invention is presented. FIG. 16 provides more detail for reference numeral 1525 of FIG. 15. At 1600, the session ID from the last buffer entry is received. At 1605, a determination is made regarding whether the received session ID matches the current session. At 1610 and 1615, an indication of the PIN test result is made based at least in part on whether the received session ID matches the current session.

Figure 17:
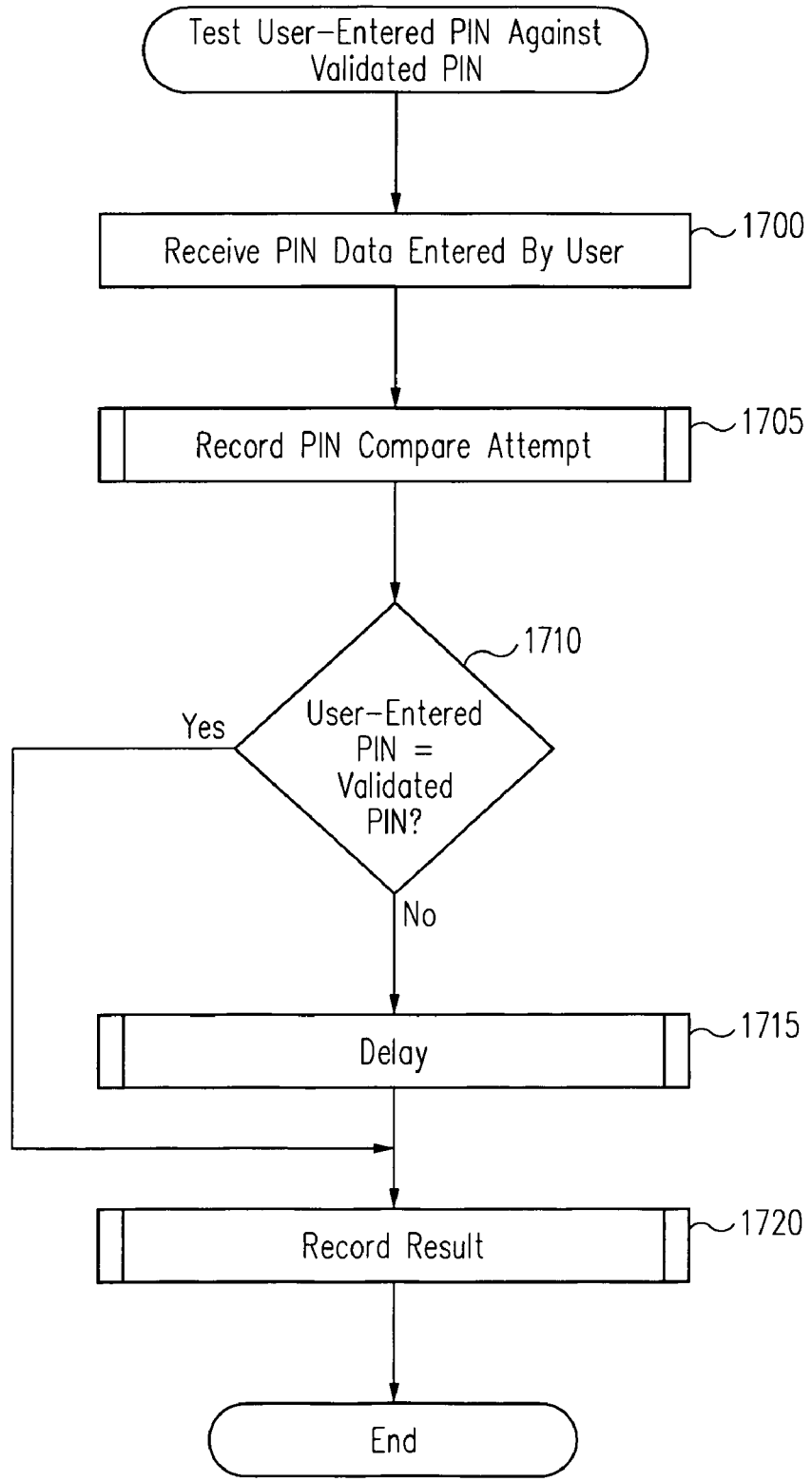
FIG. 17 is a flow diagram that illustrates a method for testing a user-entered PIN against a validated PIN in accordance with one embodiment of the present invention.

Turning now to FIG. 17, a flow diagram that illustrates a method for testing a user-entered PIN against a validated PIN in accordance with one embodiment of the present invention is presented. FIG. 17 provides more detail for reference numeral 810 of FIG. 8. At 1700, PIN data entered by a user is received. The PIN may have been included in the access request. If the PIN was not included with the access request, the secure portable device may request a user-entered PIN. At 1705, a PIN compare attempt is recorded by storing at least an exponent based at least in part on the last PIN test. At 1710, a determination is made regarding whether the user-entered PIN matches a validated PIN, which may have been recorded previously as a successful PIN test. If the user-entered PIN does not match the validated PIN, a delay is performed at 1715. At 1720, the result of the delay is recorded in the buffer by storing at least an exponent value whose value depends upon whether the user-entered PIN matched the validated PIN.

Figure 18:
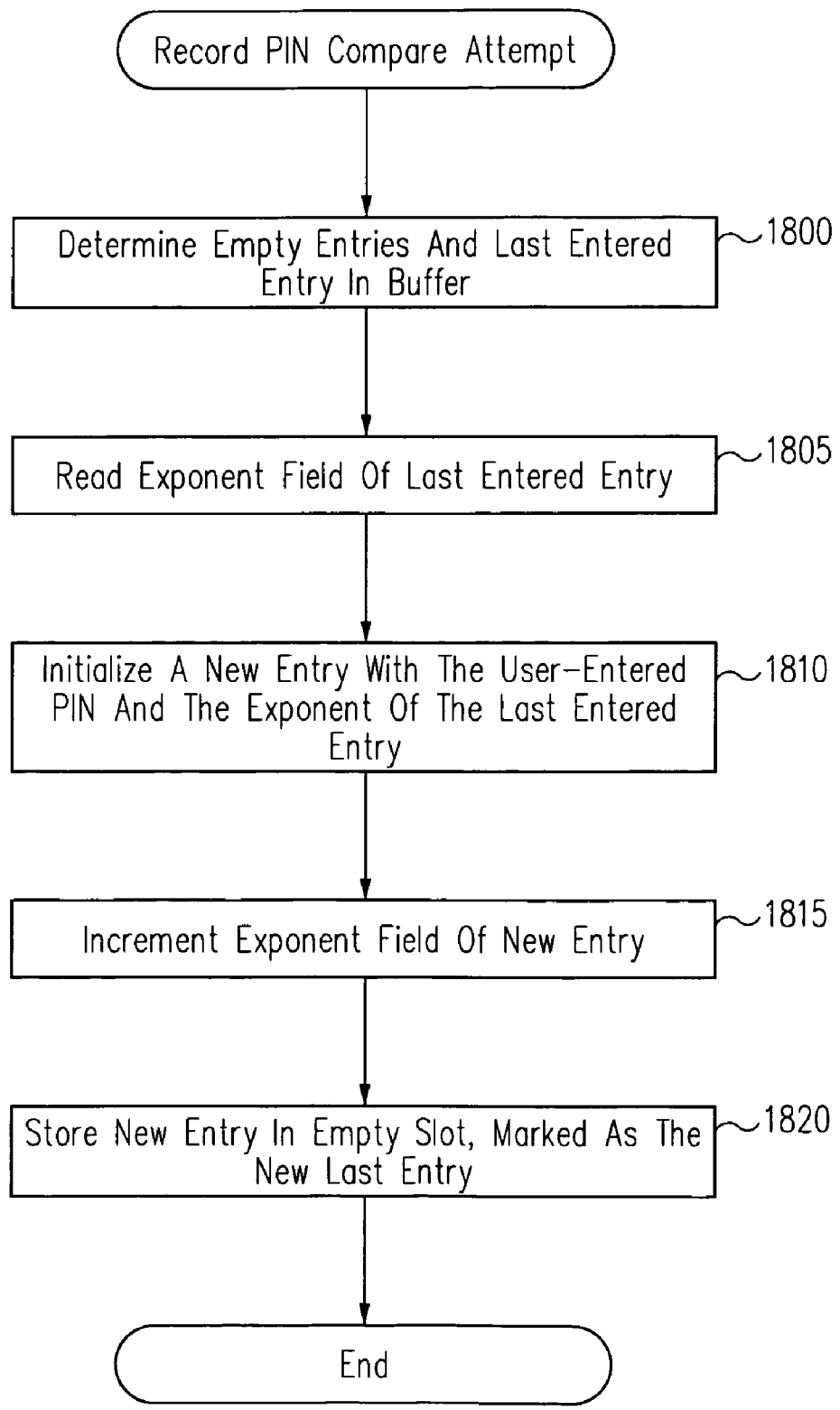
FIG. 18 is a flow diagram that illustrates a method for recording a PIN compare attempt in accordance with one embodiment of the present invention.

Turning now to FIG. 18, a flow diagram that illustrates a method for recording a PIN compare attempt in accordance with one embodiment of the present invention is presented. FIG. 18 provides more detail for reference numeral 1705 of FIG. 17. At 1800, empty entries and the last entered entry in the buffer are determined. At 1805, the exponent field of the last entered entry is read. At 1810, a new entry is initialized with the user-entered PIN and the exponent of the last entered entry. At 1815, the exponent field of the new field is incremented. At 1820, a new entry is stored in an empty slot in the buffer. An entry replacement policy ensures that the entry having the validated PIN value is never overwritten. In determining empty slots in the buffer, the latest slot having an exponent value of 0 is never considered empty. If there is more than one entry having a non-zero exponent, the oldest entry is considered empty.

Figure 19:
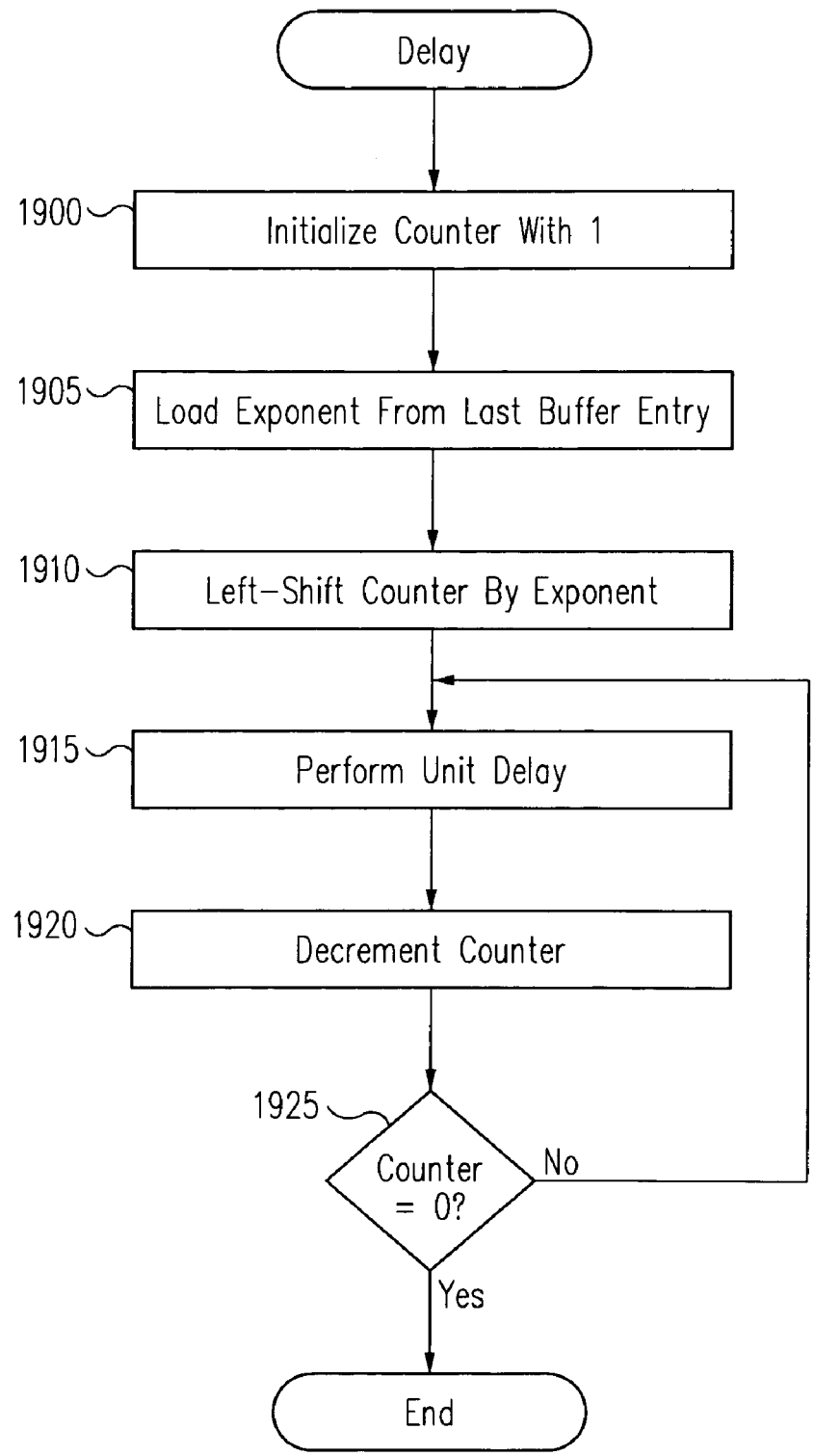
FIG. 19 is a flow diagram that illustrates a method for delaying after a failed PIN attempt in accordance with one embodiment of the present invention.

Turning now to FIG. 19, a flow diagram that illustrates a method for delaying after a failed PIN attempt in accordance with one embodiment of the present invention is presented. FIG. 19 provides more detail for reference numeral 1715 of FIG. 17 and reference numeral 1535 of FIG. 15. At 1900, a counter is initialized with 1. At 1905, the exponent from the last buffer entry is received. At 1910, the counter is left-shifted based at least in part on the exponent. At 1915, a unit delay is performed. At 1920, the counter is decremented. At 1925, a determination is made regarding whether the counter equals 0. If the counter does not equal 0, another unit delay is performed at 1915. This process continues until the counter equals 0.

Figure 20:
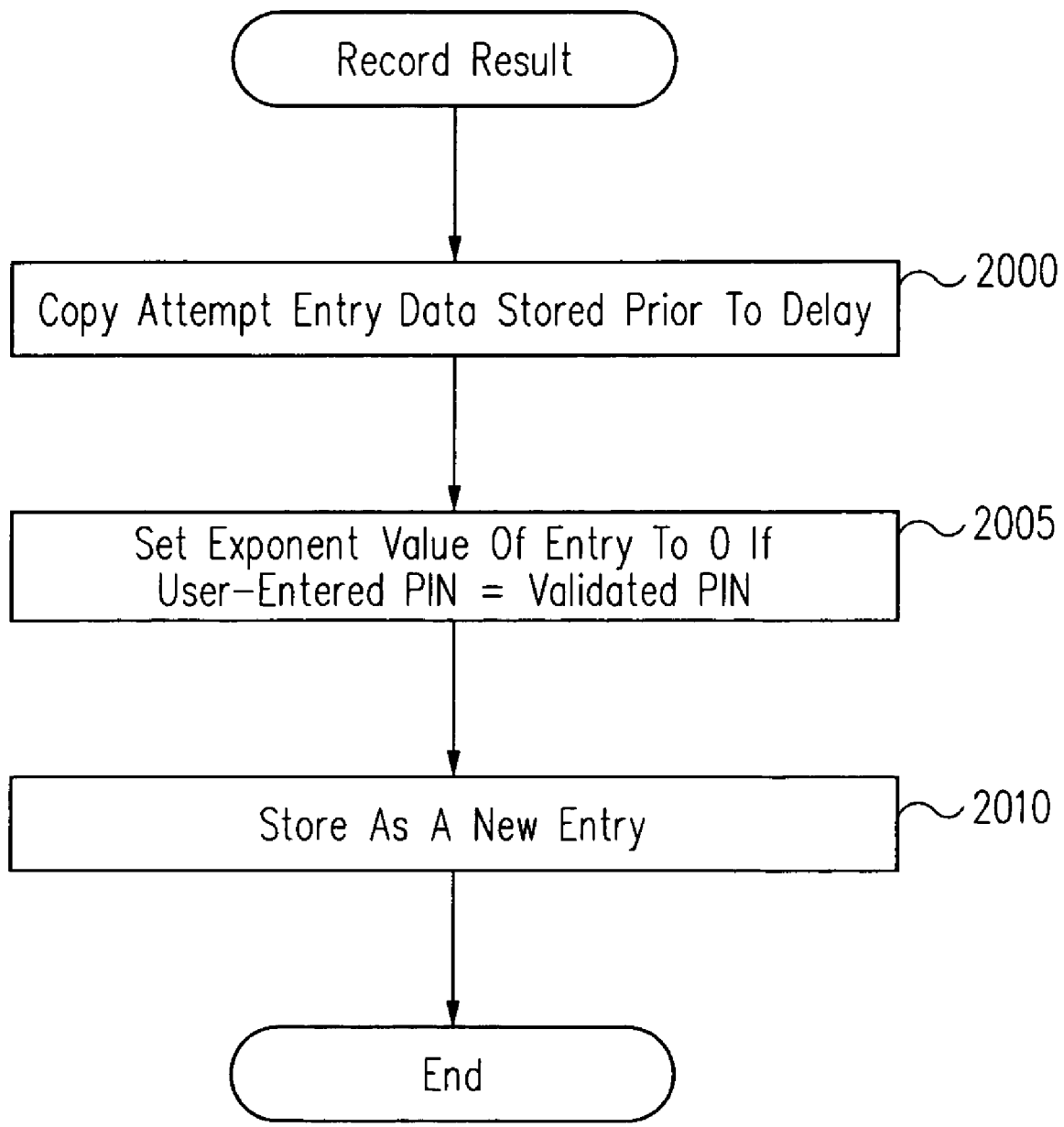
FIG. 20 is a flow diagram that illustrates a method for recording a result in accordance with one embodiment of the present invention.

Turning now to FIG. 20, a flow diagram that illustrates a method for recording a result in accordance with one embodiment of the present invention is presented. FIG. 20 provides more detail for reference numeral 1720 of FIG. 17. At 2000, the attempt entry stored prior to the delay is copied to a new entry. At 2005, the exponent value of the new entry is set to 0 if the user-entered PIN equals the validated PIN. At 2010, the new entry is stored.

FIGS. 21-24 illustrates an apparatus and method for private PIN management using scrambled PIN data in accordance with embodiments of the present invention. A secure portable device such as a smart card or the like stores a scrambled version of a validated PIN and the key used to scramble the validated PIN. A user-entered PIN is validated by scrambling the user-entered PIN with the key and then comparing the scrambled user-entered PIN with the scrambled validated PIN. The user-entered PIN is then scrambled with a new key and this new scrambled PIN is used to validate a subsequent user-entered PIN. The new scrambled PIN may be created only if the result of the comparison is a match. Alternatively, the process may be made less sensitive to side-channel attacks by creating the new scrambled PIN before the PIN comparison and storing an entry that includes the new scrambled PIN and an indication that the new scrambled PIN is untested. The entry is then marked based at least in part on the result of the PIN comparison.

Figure 21:
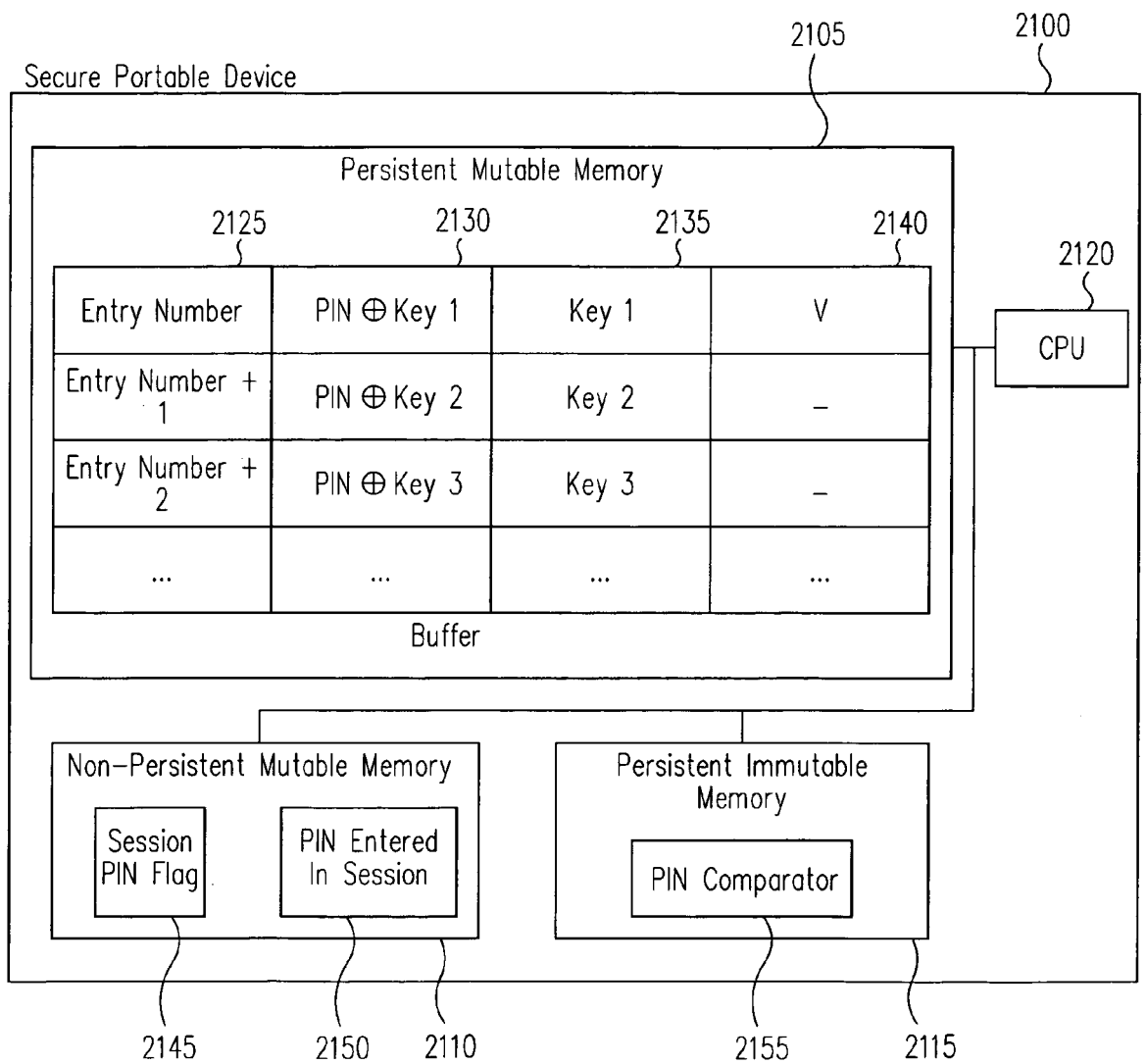
FIG. 21 is a block diagram that illustrates an apparatus for private PIN management using scrambled PIN data in accordance with one embodiment of the present invention.

Turning now to FIG. 21, a block diagram that illustrates an apparatus for private PIN management using scrambled PIN data in accordance with one embodiment of the present invention is presented. Secure portable device 2100 may be any trusted portable device such as a mobile phone or a Java Card™ technology-enabled smart card, or the like. Secure portable device 2100 includes a CPU 2120, a persistent mutable memory 2105, a non-persistent mutable memory 2110 and a persistent immutable memory 2115. According to embodiments of the present invention, persistent mutable memory 2105, non-persistent mutable memory 2110 and persistent immutable memory 2115 comprise an EEPROM, a RAM and a ROM, respectively. Persistent mutable memory 2105 comprises storage for a buffer 2160 that includes two or more entries. Each entry comprises an entry number 2125, a scrambled PIN 2130, a key 2135 and an indication of whether the scrambled PIN 2130 has been tested 2140. Alternatively, one or more of entry components 2125, 2130, 2135 and 2140 may comprise a pointer to an entry number, a scrambled PIN, a key or an indication of whether the scrambled PIN 2130 has been tested, respectively. The entry number 2125 indicates when the corresponding entry was stored relative to other entries in the buffer 2160. The scrambled PIN 2130 comprises a PIN scrambled with the corresponding key 2135.

Still referring to FIG. 21, persistent immutable memory 2115 comprises PIN comparator 2155 having code that is executed by CPU 2120 whenever a user requests access to a service accessed via the secure portable device 2100. Non-persistent mutable memory 2110 comprises storage for a session PIN flag 2145 and a PIN entered during the current session 2150.

Many other devices or subsystems (not shown) may be connected in a similar manner. Also, it is not necessary for all of the devices shown in FIG. 21 to be present to practice embodiments of the present invention. Furthermore, the devices and subsystems may be interconnected in different ways from that shown in FIG. 21. Additionally, many data structures such as a record structure or the like may be used to represent an entry in embodiments of the present invention.

In operation, a user in possession of the secure portable device 2100 requests access to a service. The requested service includes anything for which restricted access is desired. By way of example, a requested service may provide access to a range of Internet services via an Internet portal. CPU 2120 executes PIN comparator 2155 code that checks a session PIN flag 2145 that indicates whether a validated PIN has been entered for the current session. If a validated PIN has not been entered for the current session, and if the service is protected by a PIN, PIN comparator 2155 indicates a PIN comparison attempt has begun by storing a new entry that includes the PIN entered by the user, scrambled with a new key. The new entry is marked to indicate it has not been validated. The entered PIN is also scrambled with a key found in the last validated entry and then compared with the scrambled PIN in the last validated entry. If there is a match, access to the service is granted, and the new entry is marked as being validated. If there is no match, the new entry is marked as having been tested but invalid.

According to embodiments of the present invention, secure portable device 2100 comprises a CDMA technology-enabled smart card, a SIM card, a WIM, a USIM, a UIM, a R-UIM or the like.

Figure 22:
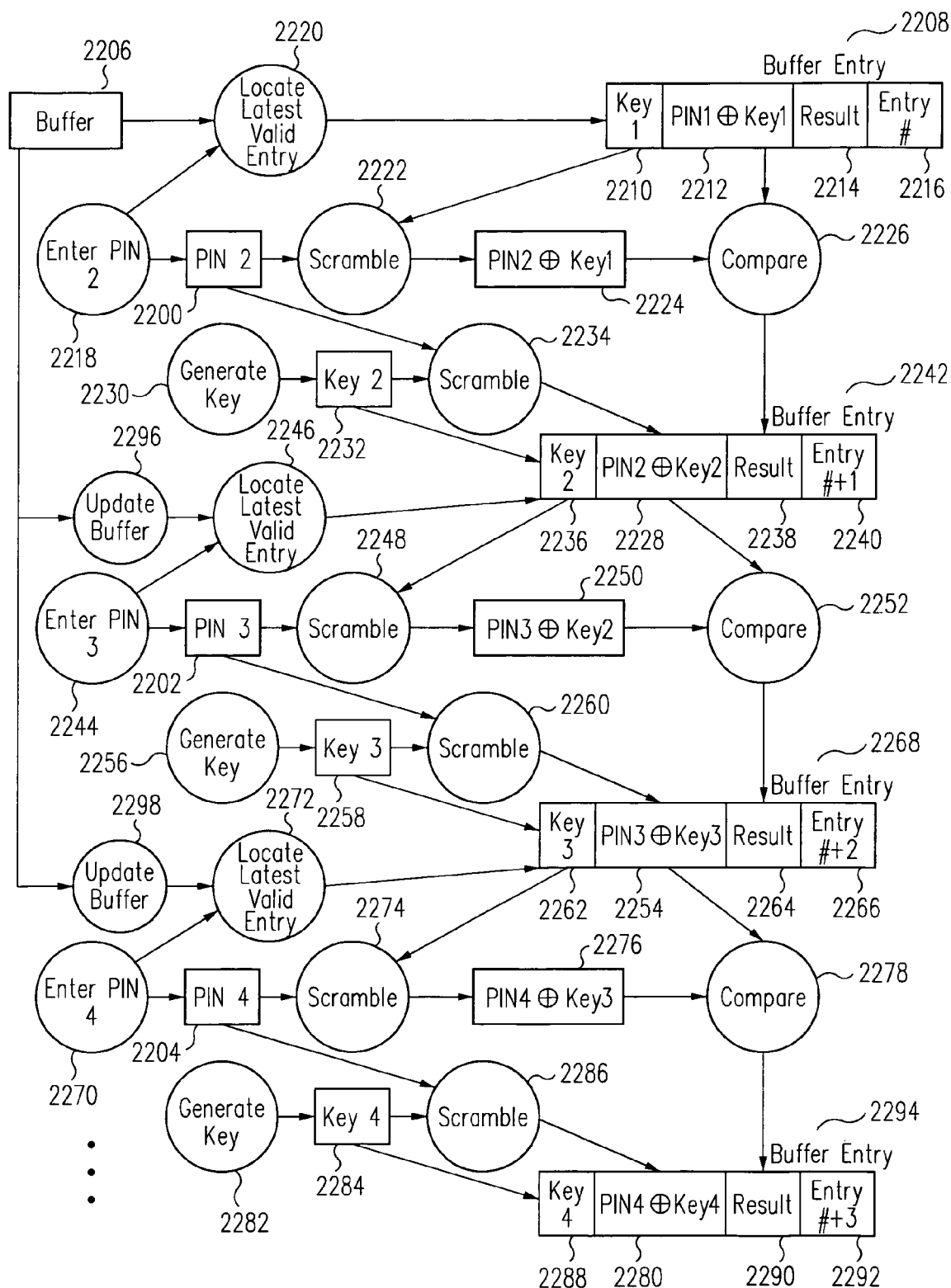
FIG. 22 is a data flow diagram that illustrates using scrambled PIN data for private PIN management in accordance with one embodiment of the present invention.

Turning now to FIG. 22, a data flow diagram that illustrates using scrambled PIN data for private PIN management in accordance with one embodiment of the present invention is presented. FIG. 22 illustrates validating three successive PINs: PIN 1 (2200), PIN 2 (2202) and PIN 3 (2204). Buffer 2206 is stored on a secure portable device and is initially populated with an entry 2208 that includes a first key 2210, a first scrambled password 2212 that comprises a validated PIN scrambled with the first key 2210, a result indicator 2214 that indicates a successful PIN comparison result, and an entry number 2216 identifying the entry as the first entry. A user in possession of the secure portable device enters (2218) a second PIN 2200 to access a service. If the service is PIN-protected, the latest valid entry 2208 is located (2220) and the secure portable device scrambles (2222) the second PIN 2200 with the first key 2210 to create a second scrambled PIN 2224. The latest valid entry is the latest entry that includes a validated PIN. The second scrambled PIN 2224 is compared (2226) to the first scrambled PIN 2212. If there is a match, access to a PIN-protected service is granted, and a third scrambled PIN 2228 is created by generating (2230) a second key 2232 and scrambling (2234) the second key 2214 with the second PIN 2200. The second key 2232, the third scrambled PIN 2228, the result 2238 of the comparison (2226) and an entry number 2240 are stored in a new buffer entry 2242.

Still referring to FIG. 22, when a third PIN 2202 is entered (2244), if the service is PIN-protected, the buffer 2206 is updated (2296), the latest valid entry 2242 is located (2246) and the secure portable device scrambles (2248) the third PIN 2202 with the second key 2236 to create a fourth scrambled PIN 2250. The fourth scrambled PIN 2250 is compared (2252) to the third scrambled PIN 2228. If there is a match, access to a PIN-protected service is granted, and a fifth scrambled PIN 2254 is created by generating (2256) a third key 2258 and scrambling (2260) the third key 2258 with the third PIN 2202. The third key 2258, the fifth scrambled PIN 2254, the result 2264 of the comparison (2252) and an entry number 2266 are stored in a new buffer entry 2268.

Still referring to FIG. 22, when a fourth PIN 2204 is entered (2270), if the service is PIN-protected, buffer 2206 is updated (2298), the latest valid entry 2268 is located (2272) and the secure portable device scrambles (2274) the fourth PIN 2204 with the fourth key 2262 to create a sixth scrambled PIN 2262. The sixth scrambled PIN 2276 is compared (2278) to the fourth scrambled PIN 2254. If there is a match, access to a PIN-protected service is granted, and a seventh scrambled PIN 2280 is created by generating (2282) a fourth key 2284 and scrambling (2286) the fourth key 2284 with the fourth PIN 2204. The fourth key 2284, the seventh scrambled password 2280, the result 2264 of the comparison (2278) and an entry number 2292 are stored in a new buffer entry 2294. This process continues with subsequent PINs, generating a new key and a new scrambled PIN with each successful PIN comparison.

Figure 23:
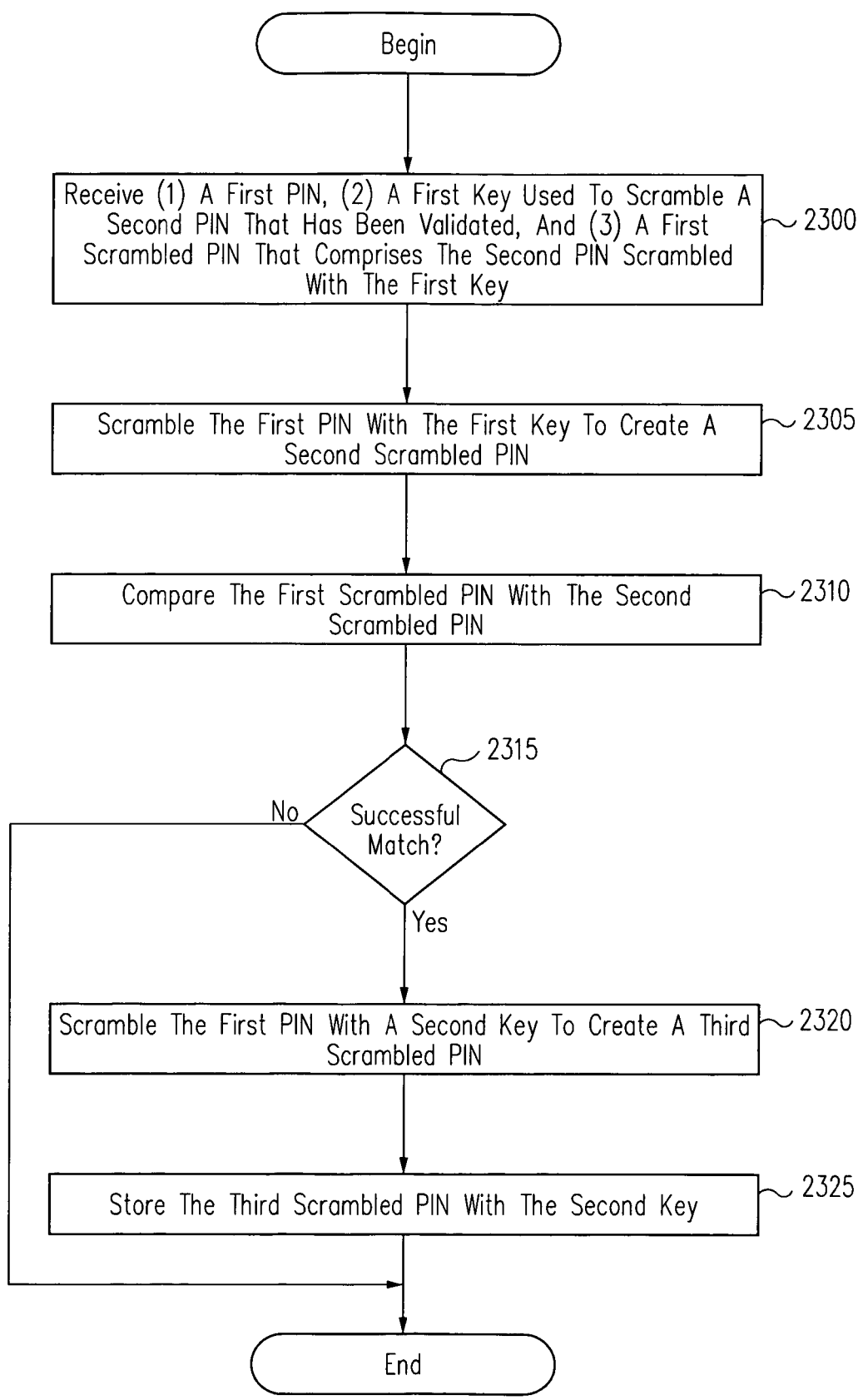
FIG. 23 is a flow diagram that illustrates a method for private PIN management using scrambled PIN data in accordance with one embodiment of the present invention.
Figure 24:
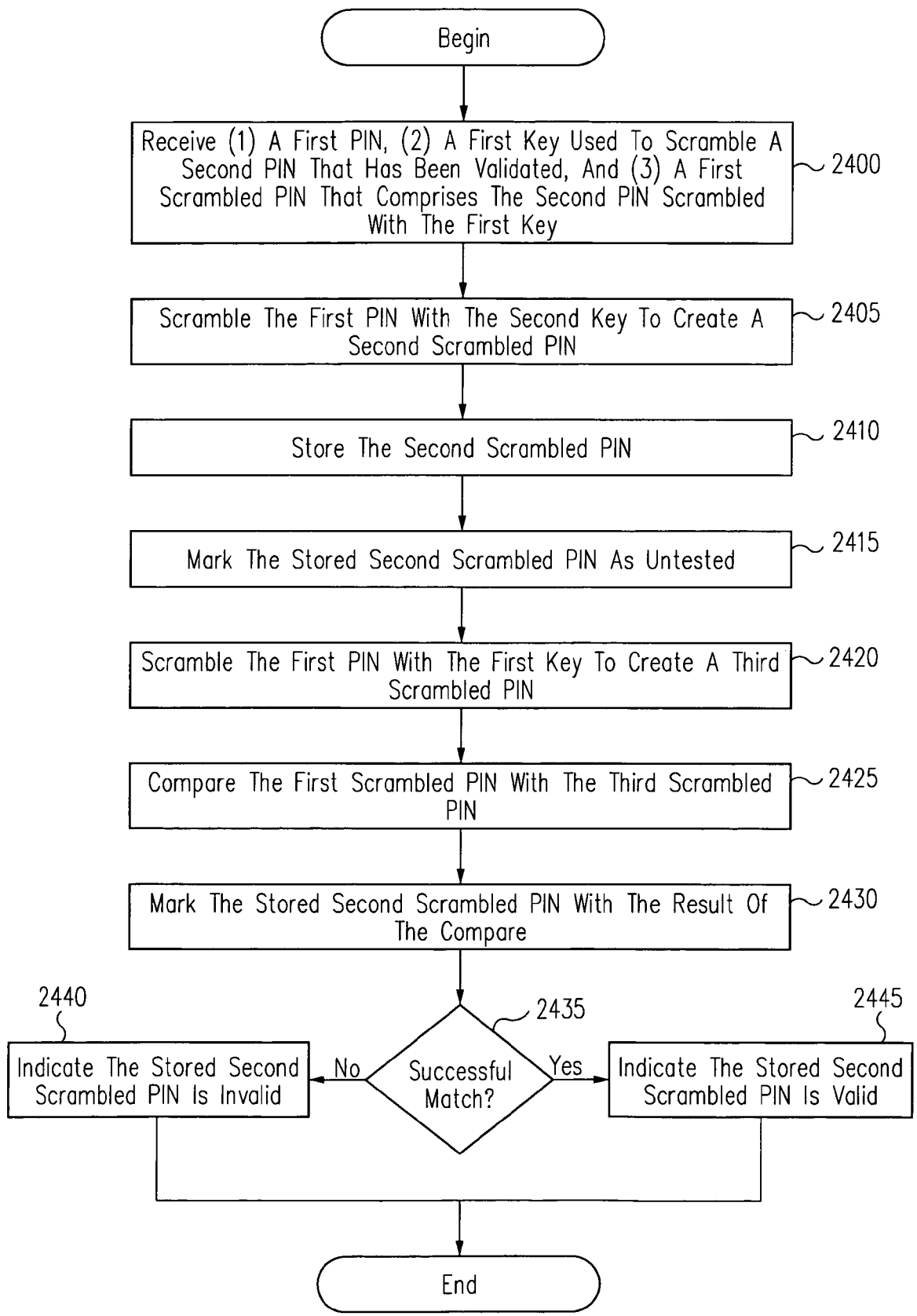
FIG. 24 is a flow diagram that illustrates a method for private PIN management using scrambled PIN data and a compare operation ordered to protect against side-channel attacks in accordance with one embodiment of the present invention.

FIGS. 23 and 24 illustrate methods for private PIN management using scrambled PIN data in accordance with embodiments of the present invention. FIG. 23 illustrates scrambling a PIN with a new key only if testing the PIN succeeds. FIG. 24 illustrates scrambling a PIN with a new key before testing the PIN and indicating whether the scrambled PIN is valid based at least in part on the test.

Turning now to FIG. 23, a flow diagram that illustrates a method for private PIN management using scrambled PIN data in accordance with one embodiment of the present invention is presented. At 2300, three items are received: (1) a first PIN, (2) a first key used to scramble a second PIN that has been validated, and (3) a first scrambled PIN that comprises the second PIN scrambled with the first key. At 2305, the first PIN is scrambled with the first key to create a second scrambled PIN. At 2310, the first scrambled PIN is compared with the second scrambled PIN. At 2315, a determination is made regarding whether the scrambled PIN tries compared at 2310 match. If the scrambled PIN tries match, an indication that the first PIN is valid is made and access to a PIN-protected service is allowed.

Reference numerals 2320 and 2325 illustrate preparation for recording the PIN test result for use in validating a subsequent PIN. At 2325, the first PIN is scrambled with a second key to create a third scrambled PIN. At 2325, the third scrambled PIN is stored with the second key for use in validating a subsequent PIN.

As shown in FIG. 23, while a user may use the same PIN to access a service multiple times, the information used for PIN validation purposes changes frequently. This means that the comparison operations used during the PIN validation process compares different data, making the process relatively insensitive to a side-channel attack.

According to one embodiment of the present invention, the first key comprises a first session ID and the second key comprises a second session ID.

According to another embodiment of the present invention, the first key comprises a first randomized key and the second key comprises a second randomized key.

Turning now to FIG. 24, a flow diagram that illustrates a method for private PIN management using scrambled PIN data and a compare operation ordered to protect against side-channel attacks in accordance with one embodiment of the present invention is presented. At 2400, three items are received: (1) a first PIN, (2) a first key used to scramble a second PIN that has been validated, and (3) a first scrambled PIN that comprises the second PIN scrambled with the first key. At 2405, the first PIN is scrambled with a second key to create a second scrambled PIN. At 2410, the second scrambled PIN is stored. At 2415, the stored second scrambled PIN is marked as untested. At 2420, the first PIN is scrambled with the first key to create a third scrambled PIN. At 2425, the first scrambled PIN is compared with the third scrambled PIN. At 2430, the stored second scrambled PIN is marked with the result of the comparison. At 2435, a determination is made regarding whether the first scrambled PIN matches the third scrambled PIN. If the first scrambled PIN does not match the third scrambled PIN, an indication that the stored second scrambled PIN is invalid is made at 2440. If the first scrambled PIN matches the third scrambled PIN, an indication that the stored second scrambled PIN is valid is made at 2445.

Note that in FIG. 24, no determination is made until the PIN comparison result is received in persistent mutable memory. Because the execution paths for validating both a PIN that matches (reference numerals 2400-2430 and 2445) and a PIN that does not match (reference numerals 2400-2430 and 2440) are similar, the process illustrated in FIG. 24 is relatively insensitive to side-channel attacks.

FIGS. 25-34 illustrate an apparatus and method for private PIN management using exponential delay that protects against card tear and side-channel attacks in accordance with embodiments of the present invention. The apparatus and method includes the circular buffer aspect illustrated with respect to FIGS. 12-20. It also includes aspects that lessen side-channel attack susceptibility illustrated with respect to FIGS. 21-24.

Figure 25:
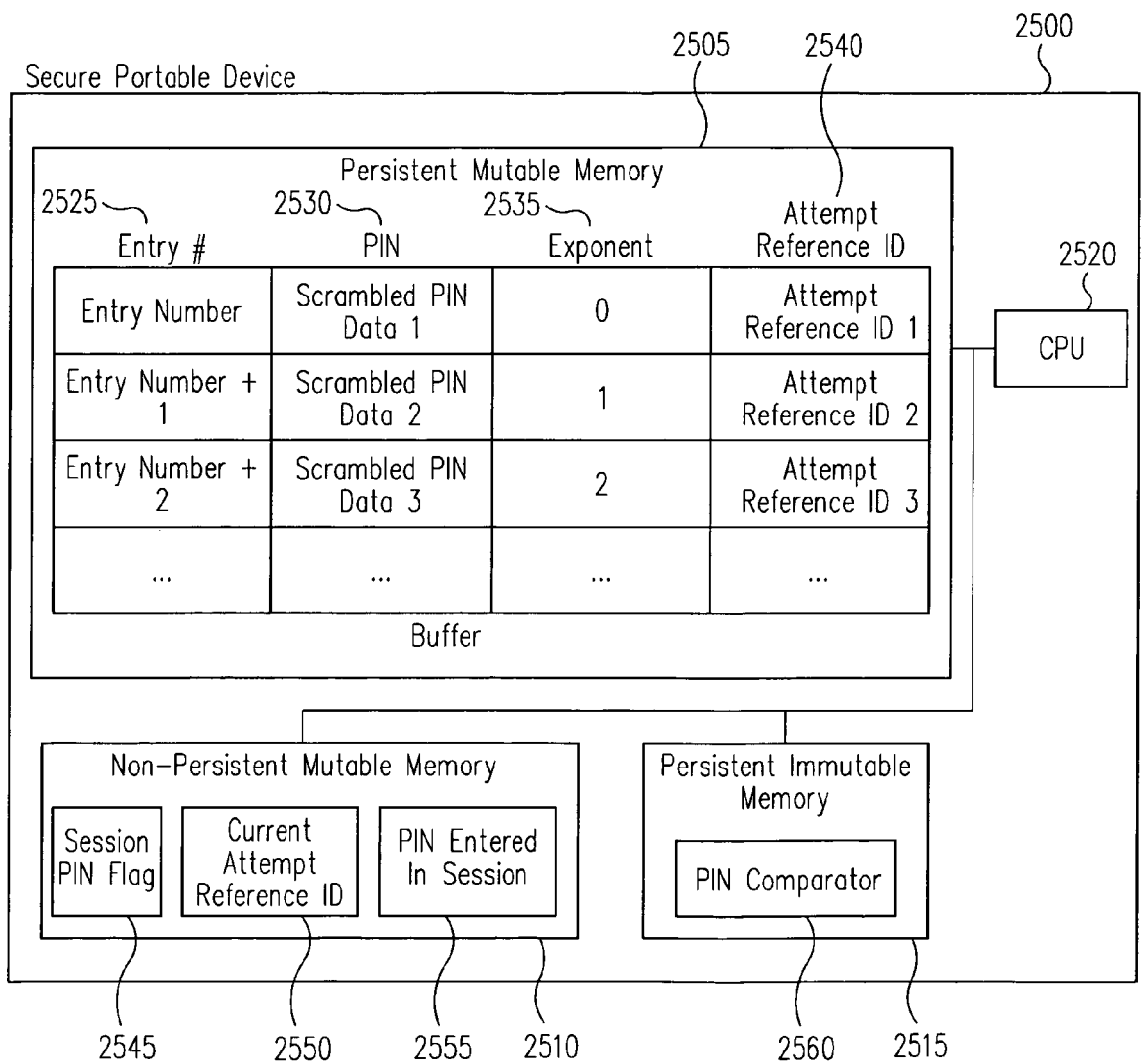
FIG. 25 is a block diagram that illustrates an apparatus for private PIN management using exponential delay that protects against card tear and side-channel attacks in accordance with one embodiment of the present invention.

Turning now to FIG. 25, a block diagram that illustrates an apparatus for private PIN management using exponential delay that protects against card tear and side-channel attacks in accordance with one embodiment of the present invention is presented. Secure portable device 2500 may be any trusted portable device such as a mobile phone or a Java Card™ technology-enabled smart card, or the like. Secure portable device 2500 includes a CPU 2520, a persistent mutable memory 2505, a non-persistent mutable memory 2510 and a persistent immutable memory 2515. According to embodiments of the present invention, persistent mutable memory 2505, non-persistent mutable memory 2510 and persistent immutable memory 2515 comprise an EEPROM, a RAM and a ROM, respectively. Persistent mutable memory 2505 comprises storage for a buffer 2565 that includes two or more entries. Each entry comprises an entry number 2525, a scrambled PIN 2530, an exponent 2535 and an attempt reference ID 2540. Alternatively, one or more of entry components 2525, 2530, 2535 and 2540 may comprise a pointer to an entry number, a scrambled PIN, an exponent or an attempt reference ID, respectively. The entry number 2525 indicates when the corresponding entry was stored relative to other entries in the buffer 2555. The scrambled PIN comprises a PIN scrambled with a key. The key may be a number such a number generated from a random or pseudo-random process. The key may also be a session ID or based at least in part on or derived from such a number. According to one embodiment of the present invention, the key comprises an attempt reference ID such as a session ID. The exponent 2535 comprises a number that is used to determine a time period to delay before checking another user-entered PIN after a failed PIN attempt. Exponent 2535 is incremented with each successive failed PIN comparison. Exponent 2535 is also reset after a successful PIN comparison. Attempt reference ID 2540 comprises an identifier such as a session ID that refers to the session associated with the entry.

Still referring to FIG. 25, persistent immutable memory 2515 comprises PIN comparator 2560 having code that is executed by CPU 2520 whenever a user requests access to a service accessed via the secure portable device 2500. Non-persistent mutable memory 2510 comprises storage for a session PIN flag 2545, a current attempt reference ID 2550 and a PIN entered during the current session 2555.

Many other devices or subsystems (not shown) may be connected in a similar manner. Also, it is not necessary for all of the devices shown in FIG. 25 to be present to practice embodiments of the present invention. Furthermore, the devices and subsystems may be interconnected in different ways from that shown in FIG. 25. Additionally, many data structures such as a record structure or the like may be used to represent an entry in embodiments of the present invention.

In operation, a user in possession of the secure portable device 2500 requests access to a service. The requested service includes anything for which restricted access is desired. By way of example, a requested service may provide access to a range of Internet services via an Internet portal. CPU 2520 executes PIN comparator 2560 code that checks a session PIN flag 2545 that indicates whether a validated PIN has been entered for the current session. If a validated PIN has not been entered for the current session, and if the service is protected by a PIN, PIN comparator 2560 indicates a PIN comparison attempt has begun by initializing a new buffer entry with a first PIN received from the user, scrambled with a key, incrementing the exponent of the new entry and storing the new entry. The new buffer entry also includes information used to derive the key used to scramble the first PIN, such as the current session ID.

PIN comparator 2560 then delays for a time period that is based at least in part on the exponent stored in the new buffer entry. A side effect of the delay is to compare (1) the first PIN scrambled with a second key used to scramble a second PIN that has been validated and (2) the second PIN scrambled with the second key. Another side effect of the delay is to terminate the delay if the two scrambled PINs match. If the two scrambled PINs match, access to the service is granted, the last buffer entry is copied to a new entry and the exponent of the new entry is set to 0 to indicate a successful match, and the entry is stored. If the two scrambled PINs do not match, PIN comparator 2560 continues to delay for a time period based at least in part on the exponent of the last entered buffer entry and records an unsuccessful PIN attempt by storing a new entry that is a copy of the last buffer entry. The exponent of buffer entries continues to be incremented with each successive failed PIN attempt, causing an exponential increase in the delay.

According to embodiments of the present invention, secure portable device 2500 comprises a CDMA technology-enabled smart card, a SIM card, a WIM, a USIM, a UIM a R-UIM or the like.

Figure 26:
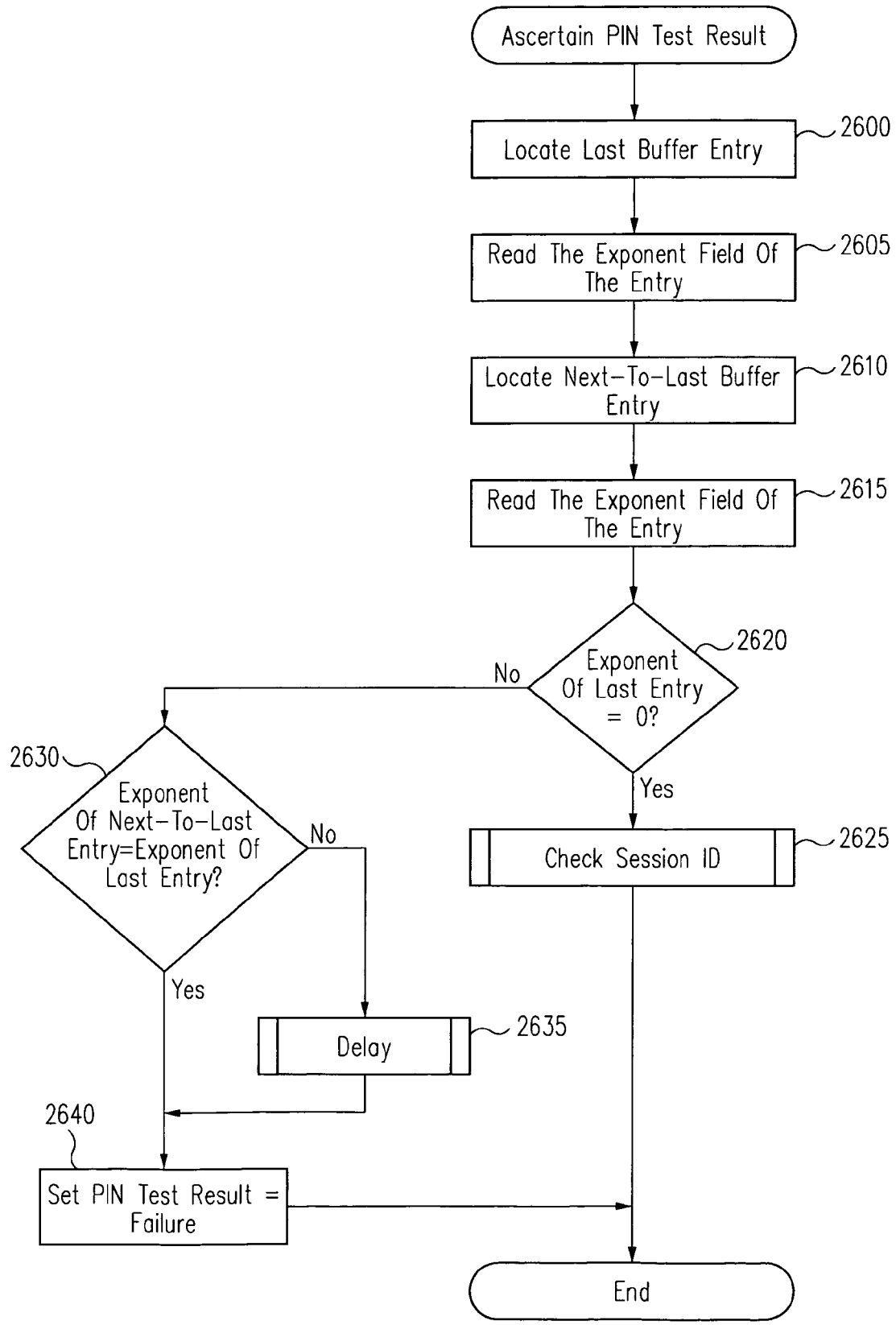
FIG. 26 is a low-level flow diagram that illustrates a method for ascertaining a PIN test result in accordance with one embodiment of the present invention.

Turning now to FIG. 26, a low-level flow diagram that illustrates a method for ascertaining a PIN test result in accordance with one embodiment of the present invention is presented. FIG. 26 is similar to FIG. 15 and provides more detail for reference numerals 800 and 815 of FIG. 8.

Figure 27:
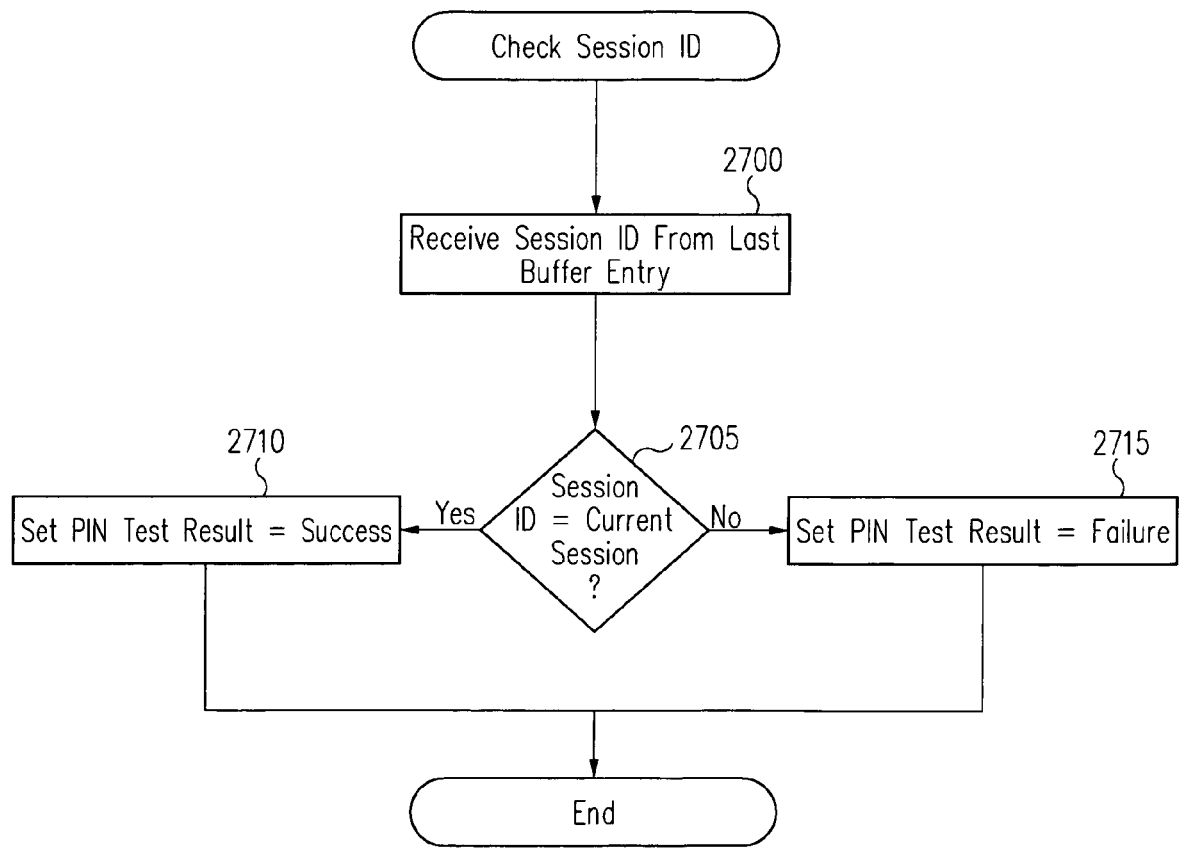
FIG. 27 is a flow diagram that illustrates a method for ascertaining a PIN test by checking a session identifier in accordance with one embodiment of the present invention.

Turning now to FIG. 27, a flow diagram that illustrates a method for ascertaining a PIN test by checking a session identifier in accordance with one embodiment of the present invention is presented. FIG. 27 is similar to FIG. 16 and provides more detail for reference numeral 2625 of FIG. 26.

Figure 28:
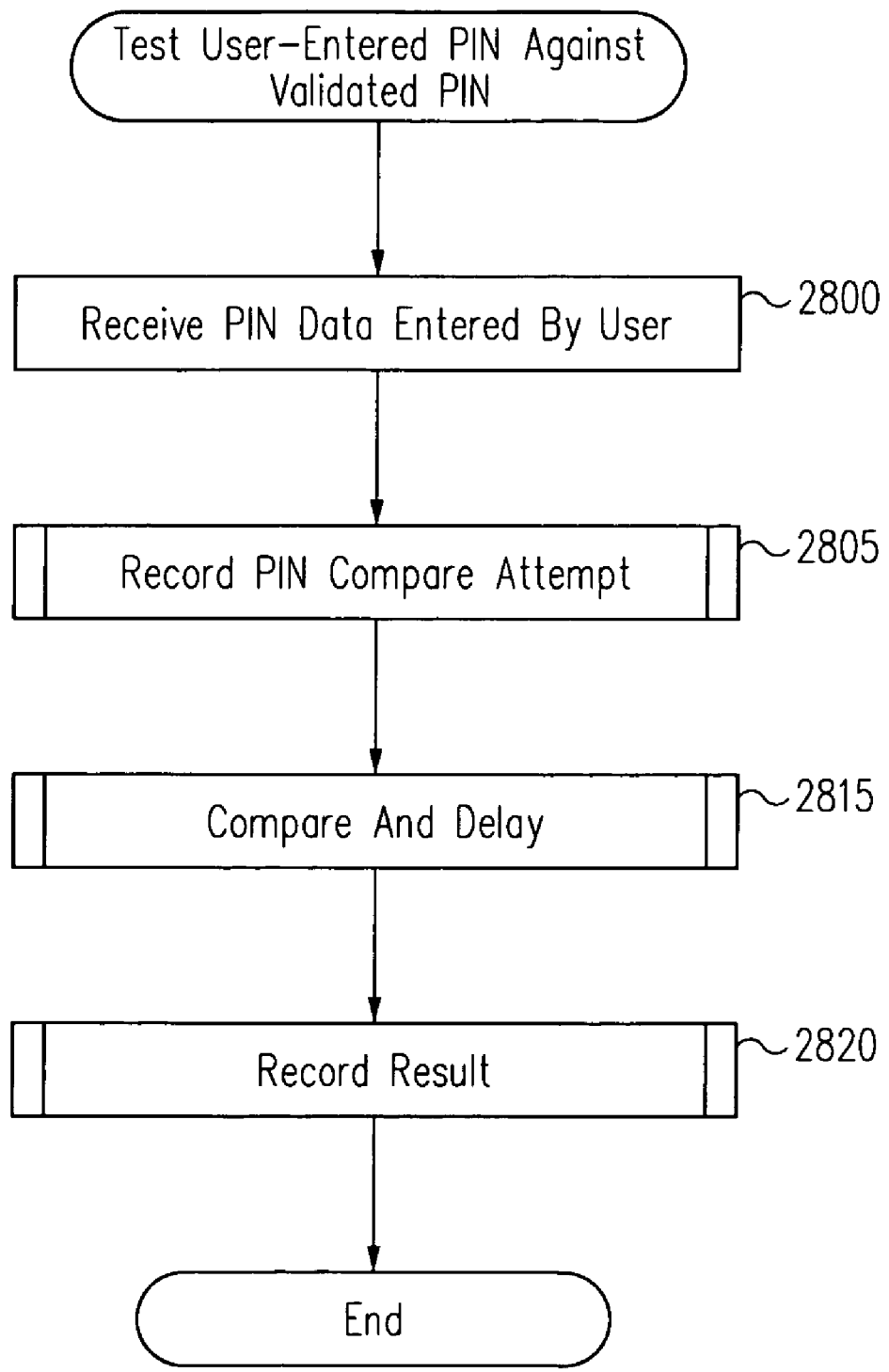
FIG. 28 is a flow diagram that illustrates a method for testing a user-entered PIN against a validated PIN in accordance with one embodiment of the present invention.

Turning now to FIG. 28, a flow diagram that illustrates a method for testing a user-entered PIN against a validated PIN in accordance with one embodiment of the present invention is presented. FIG. 28 provides more detail for reference numeral 810 of FIG. 8. FIG. 28 is similar to FIG. 17 except that the PIN comparison is a part of the delay process (2815) in FIG. 28, whereas the PIN comparison (reference numeral 1710 of FIG. 17) is separate from the delay process (reference numeral 1715 of FIG. 17) in FIG. 17. Performing the PIN comparison as part of the delay process makes execution of code that tests a validated PIN similar to execution of code that tests an invalid PIN, thus making the code execution relatively insensitive to side-channel attacks.

Figure 29:
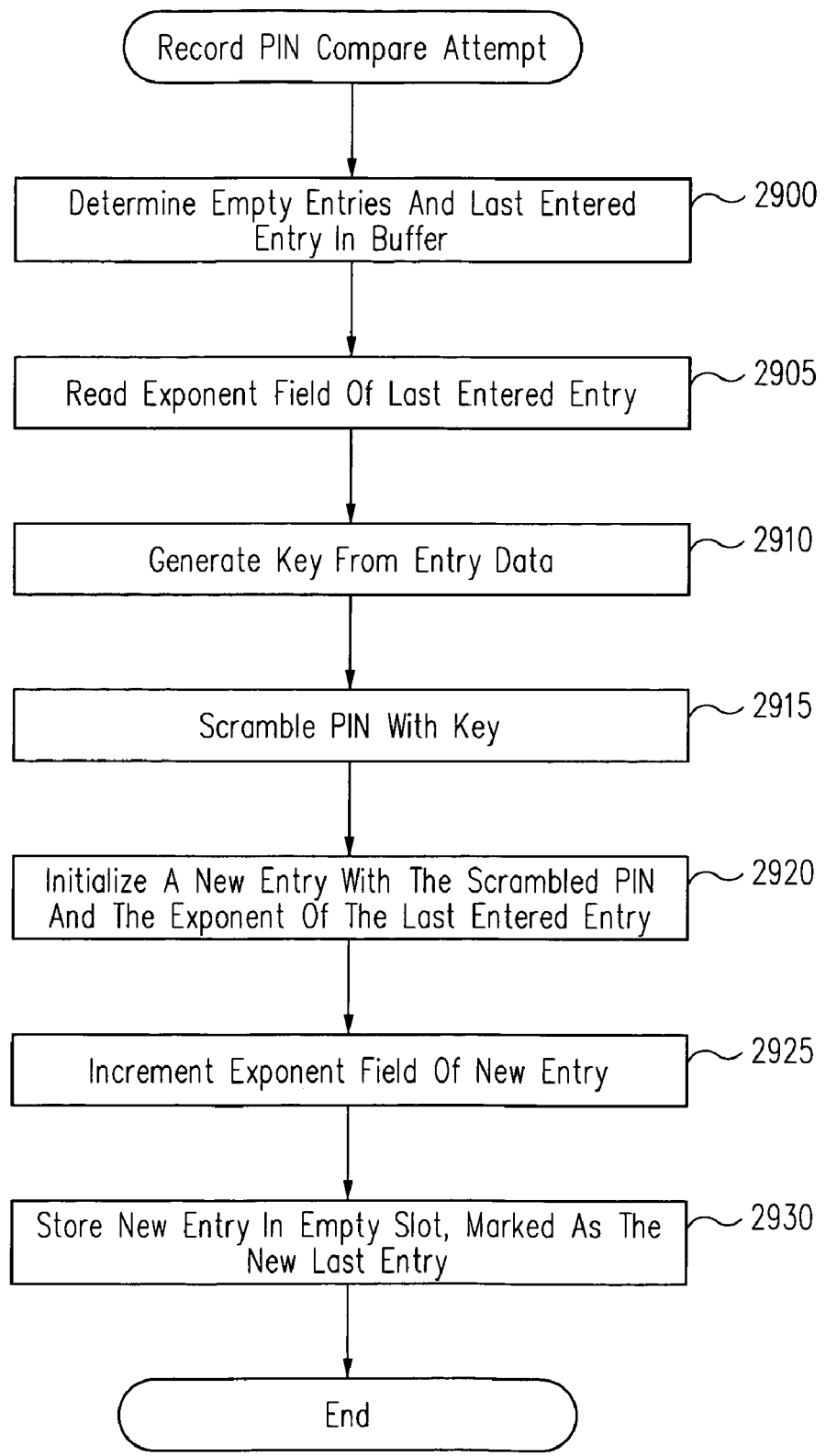
FIG. 29 is a flow diagram that illustrates a method for recording a PIN compare attempt in accordance with one embodiment of the present invention.

Turning now to FIG. 29, a flow diagram that illustrates a method for recording a PIN compare attempt in accordance with one embodiment of the present invention is presented. FIG. 29 provides more detail for reference numeral 2805 of FIG. 28. FIG. 29 is similar to FIG. 18, except that the PIN in FIG. 29 is scrambled with a key that is based at least in part on data read from the last entered entry (2915) before the scrambled PIN is stored in a new entry in the buffer (2930), whereas FIG. 18 illustrates storing unscrambled PIN data in a new buffer entry, making the PIN data stored according to FIG. 29 relatively secure. According to one embodiment of the present invention, the key is based at least in part on a session ID read from the last entered entry.

Figure 30:
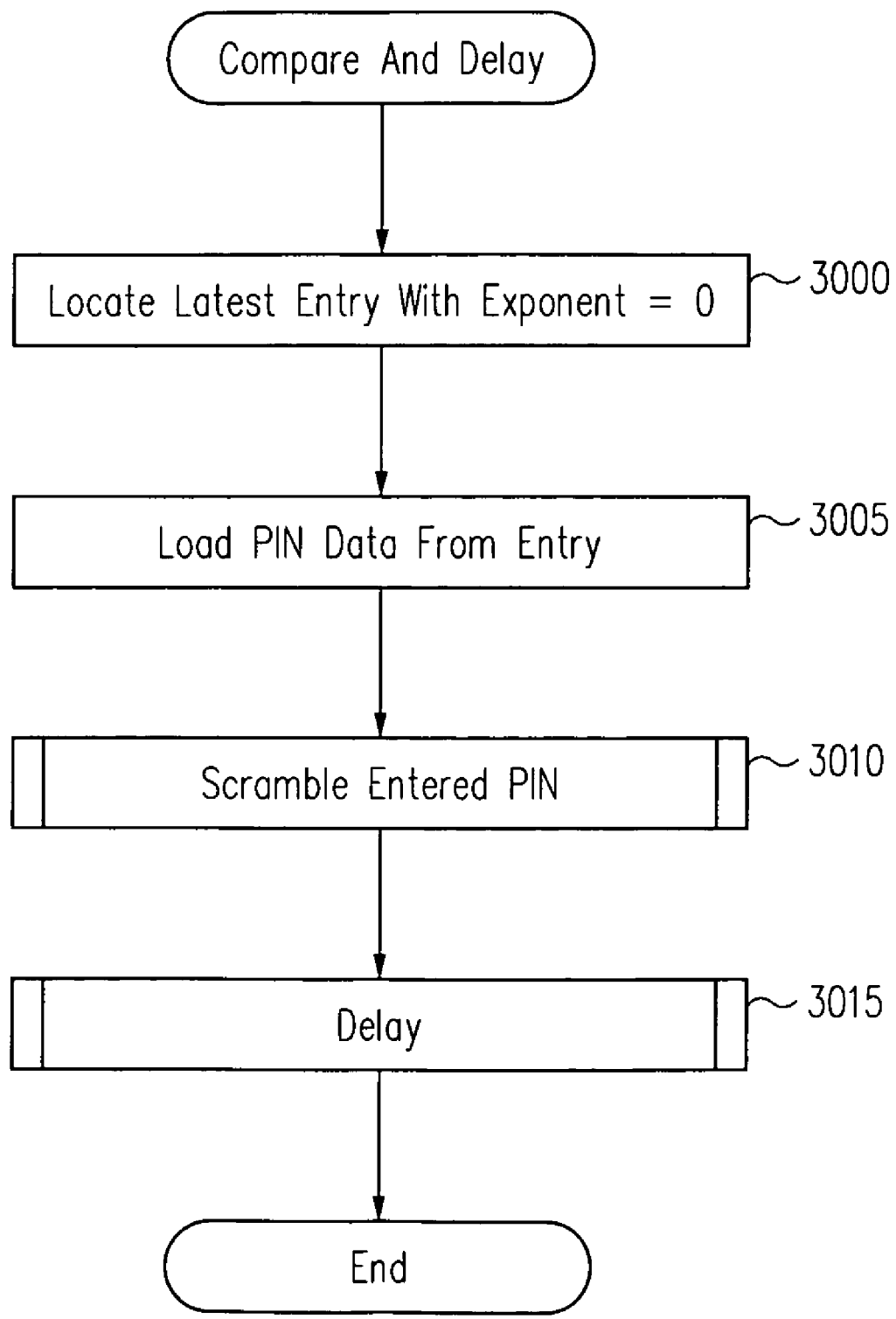
FIG. 30 is a high-level flow diagram that illustrates a method for delaying after a failed PIN attempt while also performing a PIN compare operation in accordance with one embodiment of the present invention.

Turning now to FIG. 30, a high-level flow diagram that illustrates a method for delaying after a failed PIN attempt while also performing a PIN compare operation in accordance with one embodiment of the present invention is presented. FIG. 30 provides more detail for reference numeral 2815 of FIG. 28. At 3000, the latest entry with a validated PIN is located. At 3005, PIN data from the located entry is loaded. At 3010, the entered PIN data is scrambled. At 3015, a delay based at least in part on the exponent of the last entry is performed. The PIN is scrambled (3010) before the compare (3015) because only the scrambled version of the second PIN and the session ID used to scramble it are available.

Figure 31:
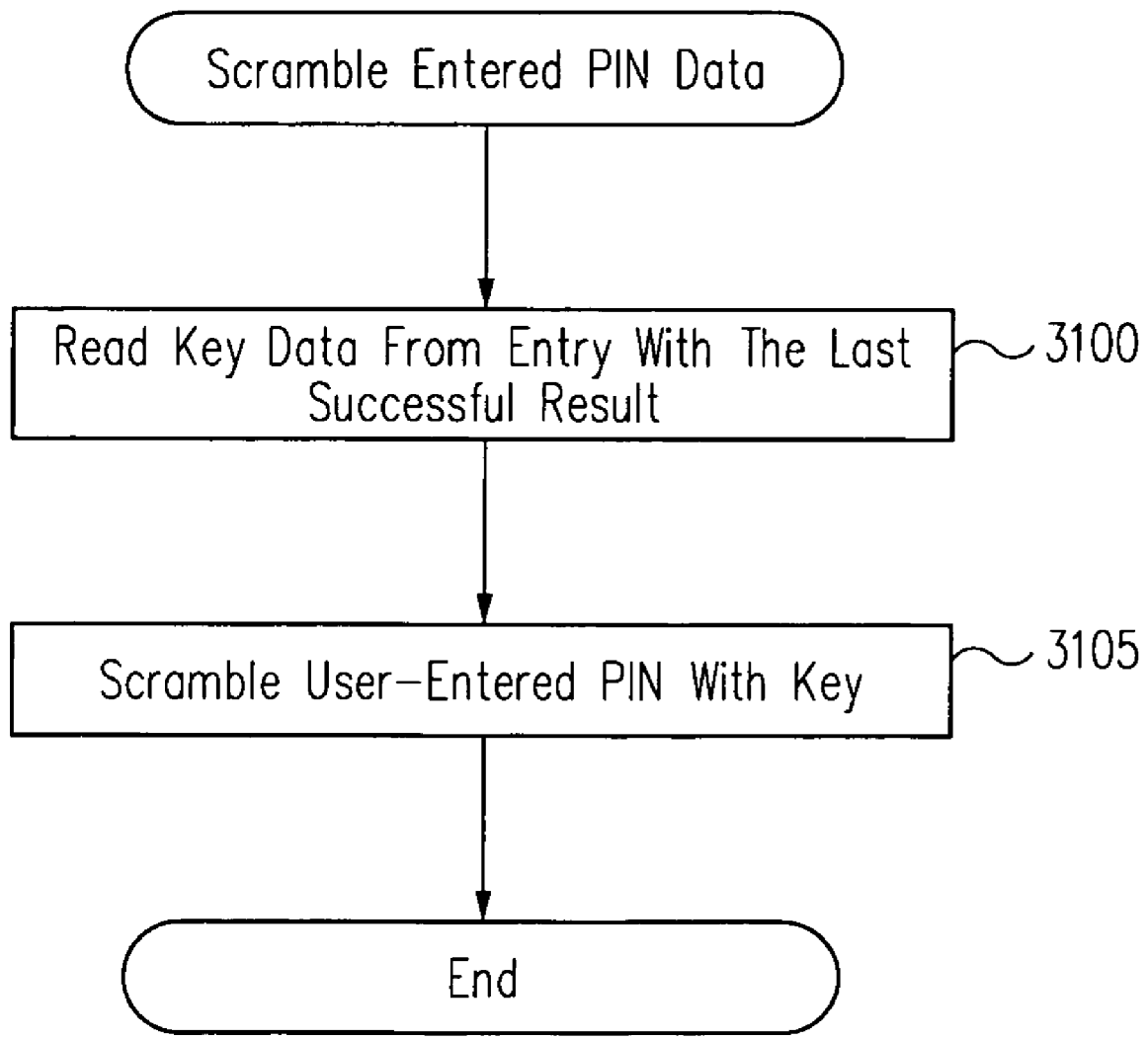
FIG. 31 is a flow diagram that illustrates a method scrambling entered PIN data in accordance with one embodiment of the present invention.

Turning now to FIG. 31, a flow diagram that illustrates a method scrambling entered PIN data in accordance with one embodiment of the present invention is presented. FIG. 31 provides more detail for reference numeral 3010 of FIG. 30. At 3100, information to derive a key is obtained from the last entry in the buffer with a successful result. According to one embodiment of the present invention, the last entry in the buffer with a successful result includes an exponent value of 0. According to one embodiment of the present invention, the key is based at least in part on a session ID. At 3105, the user-entered PIN data is scrambled with the key. According to one embodiment of the present invention, the "XOR" operation is applied to the user-entered PIN and the key.

Figure 32:
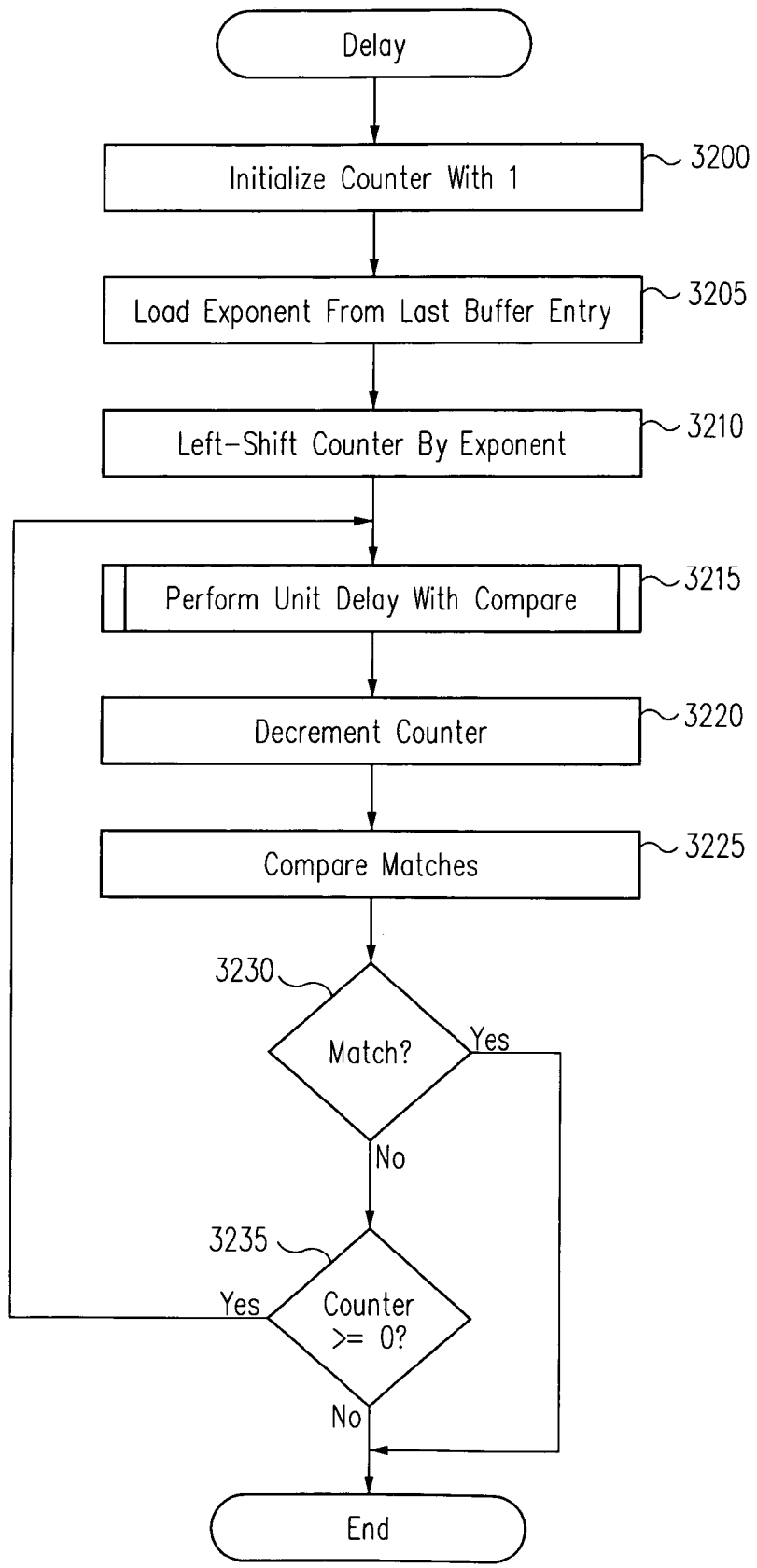
FIG. 32 is a low-level flow diagram that illustrates a method for delaying in testing a PIN attempt while also performing a PIN compare operation in accordance with one embodiment of the present invention.

Turning now to FIG. 32, a low-level flow diagram that illustrates a method for delaying in testing a PIN attempt while also performing a PIN compare operation in accordance with one embodiment of the present invention is presented. The delay is performed when the result of the PIN comparison is unsuccessful. FIG. 32 provides more detail for reference numeral 3015 of FIG. 30. FIG. 32 is similar to FIG. 19 except that the unit delay of FIG. 32 (3215) also performs a PIN comparison, making execution of the process illustrated by FIG. 32 relatively insensitive to side-channel attacks. Additionally, at 3225, the result of the matching operation performed as a side effect of the unit delay process (3215) is checked. Additional delays are performed based at least in part on the counter only if the match was unsuccessful. Thus, the delay process is short-circuited when the side effect of the delay indicates a match.

Figure 33:
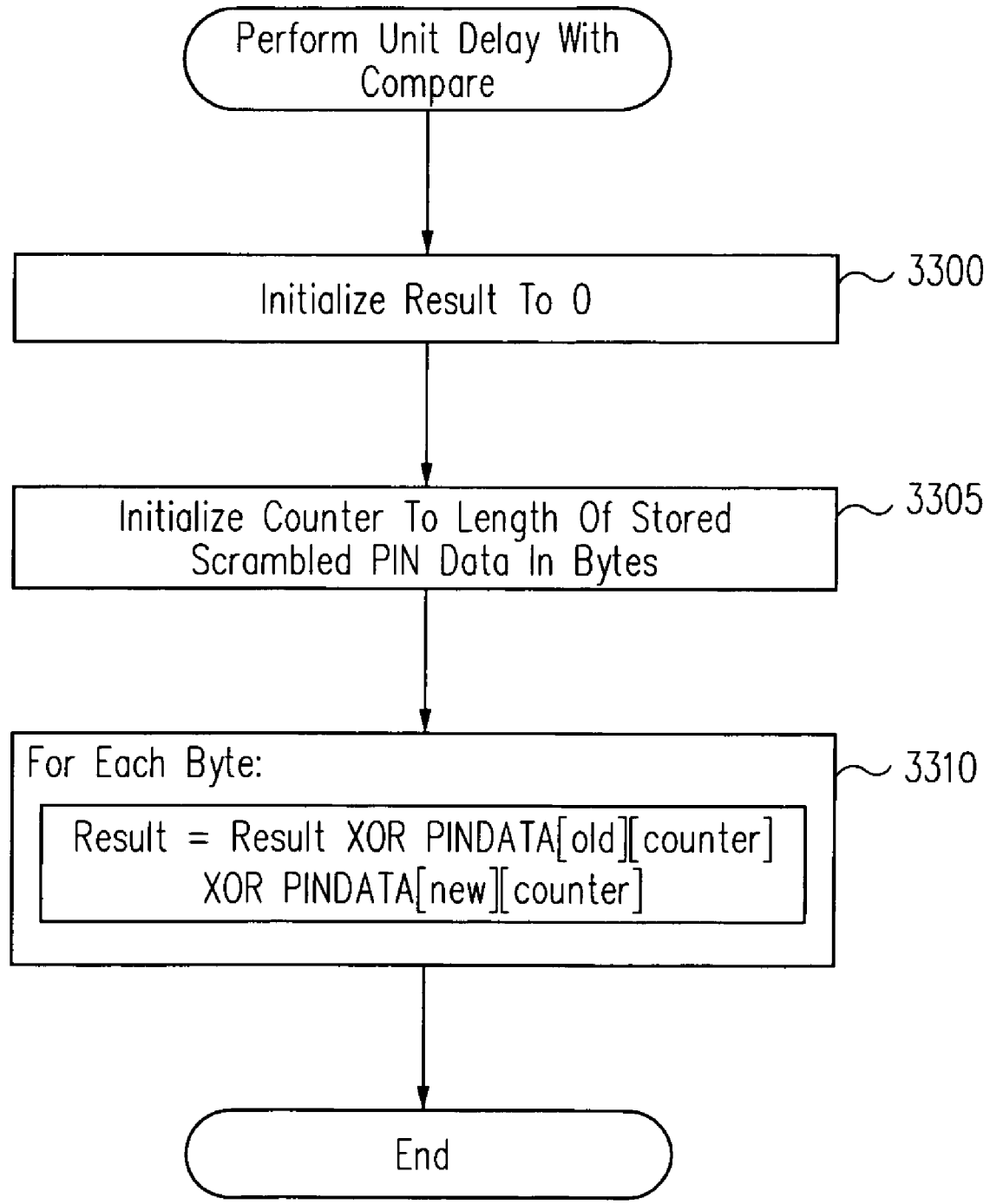
FIG. 33 is a flow diagram that illustrates a method for performing a unit delay after a failed PIN attempt while also performing a PIN compare operation in accordance with one embodiment of the present invention.

Turning now to FIG. 33, a flow diagram that illustrates a method for performing a unit delay after a failed PIN attempt while also performing a PIN compare operation in accordance with one embodiment of the present invention is presented. FIG. 33 provides more detail for reference numeral 3215 of FIG. 32. At 3300, a result is initialized to 0. At 3305, a counter is initialized to the length of the stored scrambled PIN data in bytes. At 3310, a bit-wise exclusive "OR" operation is applied byte-by-byte to the result, the current PIN data and the last successful PIN data. A final result value of "0" indicates the current PIN data matches the last successful PIN data.

The above description regarding performing the exclusive "OR" operation is not intended to be limited in any way. Those of ordinary skill in the art will recognize that the operation may be applied two or more bytes at a time.

Figure 34:
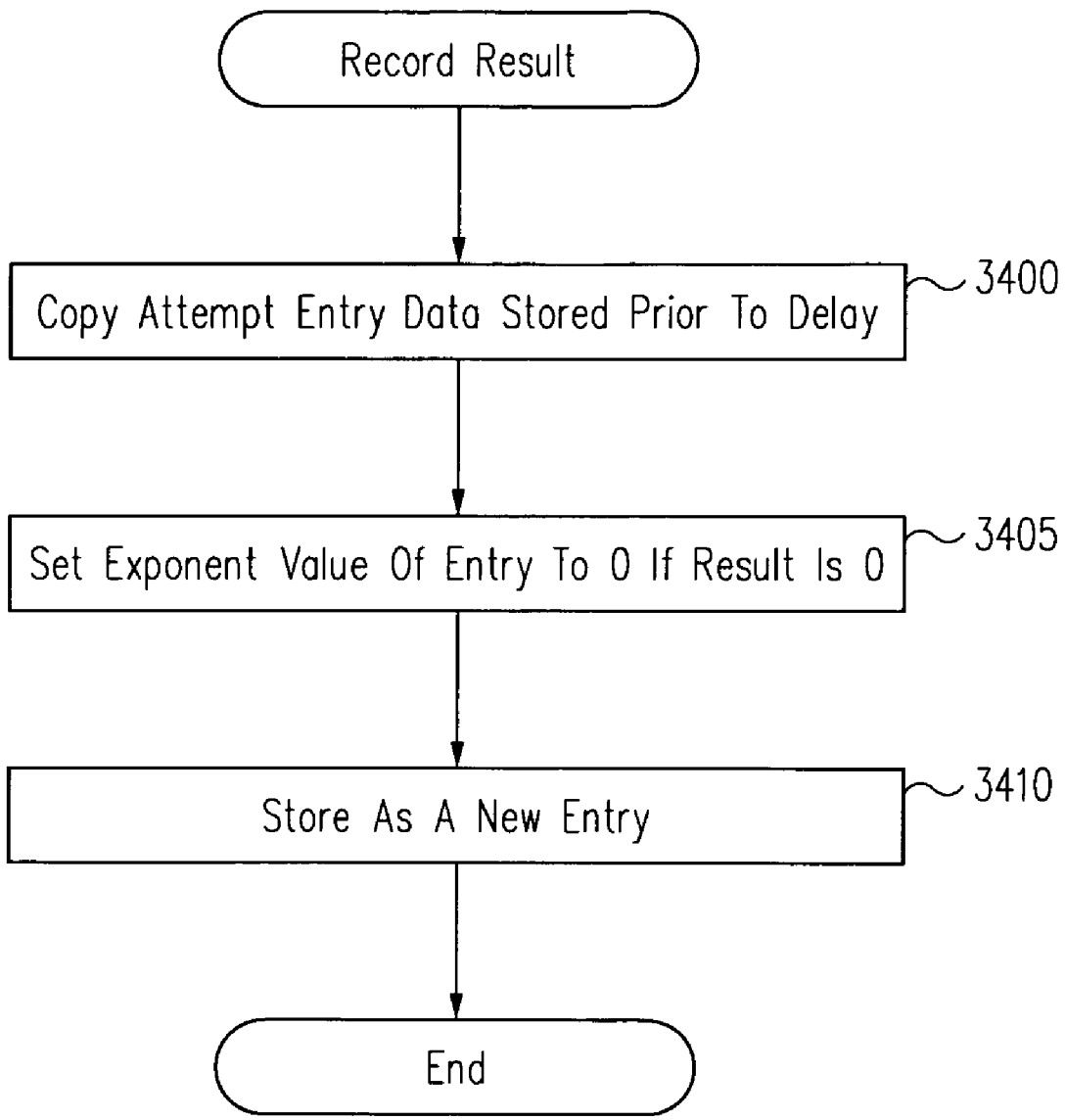
FIG. 34 is a flow diagram that illustrates a method for recording a result in accordance with one embodiment of the present invention.

Turning now to FIG. 34, a flow diagram that illustrates a method for recording a result in accordance with one embodiment of the present invention is presented. FIG. 34 provides more detail for reference numeral 2820 of FIG. 28. FIG. 34 is similar to FIG. 20, except that the exponent value of the delay result entry is set based at least in part on the result of the exclusive "OR" operation (reference numeral 3310 of FIG. 33) performed as a side-effect of a delay process in FIG. 34, instead of being based at least in part on a direct comparison of two values outside of a delay process (reference numeral 1710 of FIG. 17) as in FIG. 20.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for private personal identification number (PIN) management in a secure portable device having (1) executable instructions stored therein and (2) a processor wherein execution of said executable instructions on said processor provides the method comprising:

receiving, by said processor, a first PIN;
receiving, by said processor, a first key;
receiving, by said processor, a first scrambled PIN;
creating, by said processor, a second scrambled PIN by scrambling said first PIN with a second key;
storing, by said processor, said second scrambled PIN in a field in a memory of said secure portable device;
marking, by said processor, a test field, in said memory, for said stored second scrambled PIN as untested;
creating, by said processor, a third scrambled PIN by scrambling said first PIN with said first key;
comparing, by said processor, said first scrambled PIN with said third scrambled PIN; and marking, by said processor, said test field for said stored second scrambled PIN based at least in part on said comparing said first scrambled PIN with said third scrambled PIN.

2. The method of claim 1, further comprising validating, by said processor, said second scrambled PIN based at least in part on said marking based at least in part on said comparing said first scrambled PIN with said third scrambled PIN.

3. The method of claim 1, further comprising using, by said processor, said stored second scrambled PIN in validating a subsequent PIN.

4. The method of claim 1 wherein at least one of said first key and said second key comprise a session ID.

5. The method of claim 1 wherein at least one of said first key and said second key comprise a randomized key.

6. The method of claim 1 wherein said storing further comprises storing said second scrambled PIN in a persistent mutable memory.

7. The method of claim 6 wherein said persistent mutable memory comprises an EEPROM.

8. The method of claim 2 wherein said validating further comprises:

indicating said stored second scrambled PIN is invalid if said marking indicates said first scrambled PIN does not match said third scrambled PIN; and
indicating said stored second scrambled PIN is valid if said marking indicates said first scrambled PIN matches said third scrambled PIN.

9. A program storage device readable by a machine, embodying a program of instructions executable by a secure portable device to perform a method for private personal identification number (PIN) management wherein execution of said program of instructions by a processor on said secure portable device causes the secure portable device to perform the method comprising:

receiving, by said processor, a first PIN;
receiving, by said processor, a first key;
receiving, by said processor, a first scrambled PIN;
creating, by said processor, a second scrambled PIN by scrambling said first PIN with a second key;
storing, by said processor, said second scrambled PIN in a field in a memory of said secure portable device;
marking, by said processor, a test field, in said memory, for said stored second scrambled PIN as untested;
creating, by said processor, a third scrambled PIN by scrambling said first PIN with said first key;
comparing, by said processor, said first scrambled PIN with said third scrambled PIN; and
marking, by said processor, said test field for said stored second scrambled PIN based at least in part on said comparing said first scrambled PIN with said third scrambled PIN.

10. The program storage device of claim 9 wherein said method further comprises validating said second scrambled PIN based at least in part on said marking based at least in part on said comparing said first scrambled PIN with said third scrambled PIN.

11. The program storage device of claim 9 wherein said method further comprises using said stored second scrambled PIN in validating a subsequent PIN.

12. The program storage device of claim 9 wherein at least one of said first key and said second key comprise a session ID.

13. The program storage device of claim 9 wherein at least one of said first key and said second key comprise a randomized key.

14. The program storage device of claim 9 wherein said storing further comprises storing said second scrambled PIN in a persistent mutable memory.

15. The program storage device of claim 9 wherein said persistent mutable memory comprises an EEPROM.

16. The program storage device of claim 10 wherein said validating further comprises:
   indicating said stored second scrambled PIN is invalid if said marking indicates said first scrambled PIN does not match said third scrambled PIN; and
   indicating said stored second scrambled PIN is valid if said marking indicates said first scrambled PIN matches said third scrambled PIN.

17. An apparatus for private personal identification number (PIN) management, the apparatus comprising:
   a memory for storing at least one key, at least one scrambled PIN, and at least one validity indication;
   a processor; and
   executable instructions stored on said apparatus, wherein execution of said executable instructions on said processor causes the processor to perform the method including:
   receiving, by said processor, a first PIN;
   receiving, by said processor, a first key;
   receiving, by said processor, a first scrambled PIN;
   creating by said processor, a second scrambled PIN by scrambling said first PIN with a second key;
   storing, by said processor, said second scrambled PIN in a field in memory of said secure portable device;
   marking, by said processor, a test field, in said memory, for said stored second scrambled PIN as untested;
   creating by said processor, a third scrambled PIN by scrambling said first PIN with said first key;
   comparing, by said processor, said first scrambled PIN with said third scrambled PIN; and
   marking, by said processor, said test field for said stored second scrambled PIN based at least in part on said comparing said first scrambled PIN with said third scrambled PIN.

18. The apparatus of claim 17 wherein said method further includes validating said second scrambled PIN based at least in part on said mark based at least in part on said comparing said first scrambled PIN with said third scrambled PIN.

19. The apparatus of claim 17 wherein said method further includes validating a subsequent PIN using said stored second scrambled PIN.

20. The apparatus of claim 17 wherein at least one of said first key and said second key comprise a session ID.

21. The apparatus of claim 17 wherein at least one of said first key and said second key comprise a randomized key.

22. The apparatus of claim 17 wherein said memory comprises a persistent mutable memory.

23. The apparatus of claim 22 wherein said persistent mutable memory comprises an EEPROM.

24. The apparatus of claim 18 wherein said method further includes
   indicating said stored second scrambled PIN is invalid if said marking indicates said first scrambled PIN does not match said third scrambled PIN; and
   indicating said stored second scrambled PIN is valid if said marking indicates said first scrambled PIN matches said third scrambled PIN.

25. The apparatus of claim 17 wherein said apparatus comprises a smart card.

26. The apparatus of claim 17 wherein said smart card comprises a Java Card™ technology-enabled smart card.

27. The apparatus of claim 17 wherein said smart card comprises a CDMA (Code Division Multiple Access) technology-enabled smart card.

28. The apparatus of claim 17 wherein said smart card comprises a SIM (Subscriber Identity Module) card.

29. The apparatus of claim 17 wherein said smart card comprises a WIM (Wireless Interface Module).

30. The apparatus of claim 17 wherein said smart card comprises a USIM (Universal Subscriber Identity Module).

31. The apparatus of claim 17 wherein said smart card comprises a UIM (User Identity Module).

32. The apparatus of claim 17 wherein said smart card comprises a R-UIM (Removable User Identity Module).

33. The apparatus of claim 17 wherein said apparatus comprises a mobile phone.

* * * * *

UNITED STATES PATENT AND TRADEMARK OFFICE
CERTIFICATE OF CORRECTION

PATENT NO. : 7,596,531 B2
APPLICATION NO. : 10/164662
DATED : September 29, 2009
INVENTOR(S) : Eduard K. de Jong Page 1 of 1

It is certified that error appears in the above-identified patent and that said Letters Patent is hereby corrected as shown below:

In Column 23, Line 13, Claim 15, replace "claim 9" with --claim 14--;
In Column 23, Line 30, Claim 17, between "causes" and "processor", replace "the" with --said--;
In Column 23, Line 30, Claim 17, between "perform" and "method", replace "the" with --a--;
In Column 24, Line 21, Claim 24, replace "includes" with --includes:--.

Signed and Sealed this

First Day of December, 2009

David J. Kappos
*Director of the United States Patent and Trademark Office*